United States Patent [19]

Korenberg

[11] Patent Number: 4,457,289

[45] Date of Patent: Jul. 3, 1984

[54] FAST FLUIDIZED BED REACTOR AND METHOD OF OPERATING THE REACTOR

[75] Inventor: Jakob Korenberg, York, Pa.

[73] Assignee: York-Shipley, Inc., York, Pa.

[21] Appl. No.: 370,248

[22] Filed: Apr. 20, 1982

[51] Int. Cl.³ .............................................. F22B 1/00
[52] U.S. Cl. ................................... 122/4 D; 110/245; 110/263; 165/104.16; 431/7; 431/170,
[58] Field of Search ............... 122/4 D; 110/245, 263, 110/234, 345, 346, 342, 344; 431/7, 170; 165/104.16

[56] References Cited

U.S. PATENT DOCUMENTS

| | | | |
|---|---|---|---|
| 1,618,808 | 2/1927 | Burg | 431/173 |
| 2,800,091 | 7/1957 | Lotz et al. | 110/264 |
| 3,366,080 | 1/1968 | Albertson | 110/245 |
| 3,565,022 | 2/1971 | Bishop | 110/245 |
| 3,577,938 | 5/1971 | Muirhead et al. | 110/245 |
| 3,589,315 | 6/1971 | Hart | 110/265 |
| 3,777,678 | 12/1973 | Lutes et al. | 110/244 |
| 3,788,796 | 1/1974 | Krippene et al. | 110/342 |
| 3,834,327 | 9/1974 | Hellstrom et al. | 110/216 |
| 3,855,951 | 12/1974 | Giles | 110/216 |
| 3,858,534 | 1/1975 | Berg | 110/234 |
| 3,863,577 | 2/1975 | Steever et al. | 110/245 |

(List Continued on next page.)

FOREIGN PATENT DOCUMENTS

| | | |
|---|---|---|
| 1467096 | 4/1964 | Fed. Rep. of Germany . |
| 16730 | 2/1979 | Japan ................................ 110/245 |
| 124567 | 9/1979 | Japan ................................ 110/245 |
| 913 | 1/1981 | Japan ................................ 110/245 |
| 40019 | 4/1981 | Japan ................................ 110/245 |
| 108018 | 8/1981 | Japan ................................ 110/245 |
| 7416372 | 6/1975 | Netherlands . |
| 1147899 | 4/1969 | United Kingdom . |
| 1226087 | 3/1971 | United Kingdom . |
| 2059031 | 4/1981 | United Kingdom . |

OTHER PUBLICATIONS

"Combustion in Swirling Flows: A Review" by N. Syred and J. M. Beer, *Combustion and Flame* 23, 143–201 (1974).

"Combustion in the Circulating Fluid Bed: An Alternative Approach in Energy Supply and Environmental Protection": by V. Petersen et al., *The Proceedings of the Sixth International Conference on Fluidized Bed Combustion*, vol. III—Technical Sessions, Published Aug. 1980.

The Feasibility of Utilizing Forest Residues for Energy and Chemicals, U.S. Dept. of Commerce, National Technical Information Service, Forest Service, Mar. 1976.

"Pyroflow TM Circulating Fluidized Bed Combustion System", Pyropower Corporation.

"Fluidized Bed Combustion" Pyropower Corporation.

*Primary Examiner*—Edward G. Favors
*Assistant Examiner*—Steven E. Warner
*Attorney, Agent, or Firm*—Finnegan, Henderson, Farabow, Garrett & Dunner

[57] ABSTRACT

A method of operating a fast fluidized bed reactor according to the invention comprises: (1) providing a fluidized bed reactor having an upper and a lower region, the upper region having a cylindrical shape; (2) feeding matter to be reacted into the lower region of the reactor; (3) supplying a first stream of pressurized air to the reactor in the lower region at a velocity to fluidize the granular material in the circulating regime, a portion of the granular material is continually entrained into the upper region; (4) tangentially supplying a second stream of pressurized air to the upper region wherein, at maximum operating capacity for the reactor, the second stream of air constitutes in excess of about 50% of the total pressurized air fed to the reactor; (5) maintaining a Swirl number of at least about 0.6 and a Reynolds number of at least about 18,000 in the upper region for providing a cyclone of turbulence which increases the rate of reaction in the reactor; and (6) permitting the reaction gases in the upper region to exit from the reactor through an exit throat, while retaining substantially all of the granular material within the reactor. In accordance with the invention, cyclone particle separators are not required.

Apparatus suitable for use in practicing the above-recited method are also disclosed.

47 Claims, 10 Drawing Figures

U.S. PATENT DOCUMENTS

| | | | |
|---|---|---|---|
| 3,888,193 | 6/1975 | Kishigami et al. | 110/245 |
| 3,921,590 | 11/1975 | Mitchell et al. | 122/4 D |
| 3,927,627 | 12/1975 | Brunn | 110/342 |
| 4,052,140 | 10/1977 | Highley | 110/245 |
| 4,075,953 | 2/1978 | Sowards | 110/245 |
| 4,111,158 | 9/1978 | Reh et al. | 122/4 D |
| 4,159,000 | 6/1979 | Iwasaki et al. | 110/244 |
| 4,159,682 | 7/1979 | Fitch et al. | 110/245 |
| 4,165,717 | 8/1979 | Reh et al. | 122/4 D |
| 4,183,330 | 1/1980 | Bryers et al. | 110/245 |
| 4,218,426 | 8/1980 | Dahmen | 110/345 |
| 4,259,911 | 4/1981 | Jones | 110/245 |
| 4,270,468 | 6/1981 | Robinson et al. | 110/346 |
| 4,292,023 | 9/1981 | DeFeo et al. | 110/245 |
| 4,308,806 | 1/1982 | Uemura et al. | 110/346 |

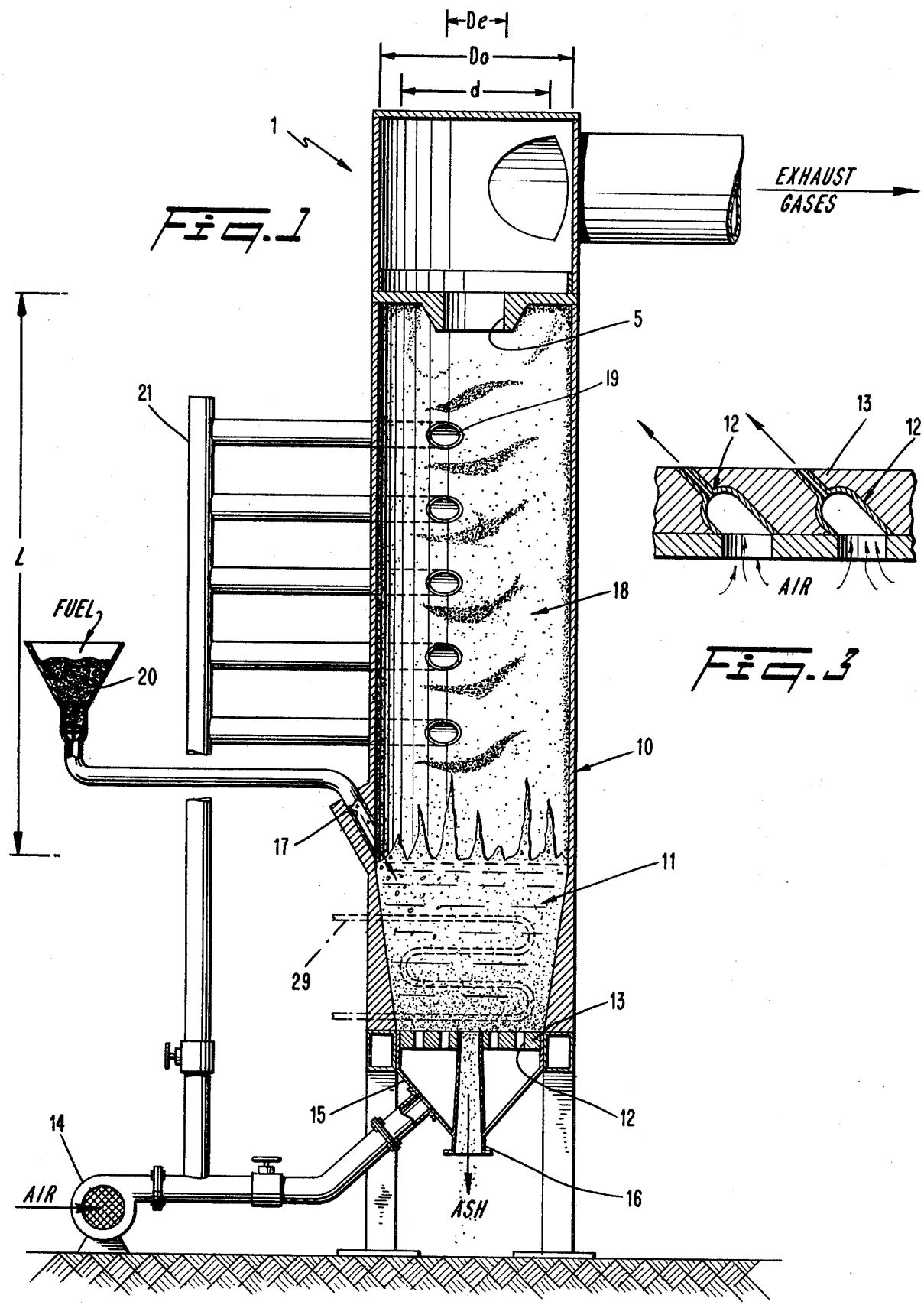

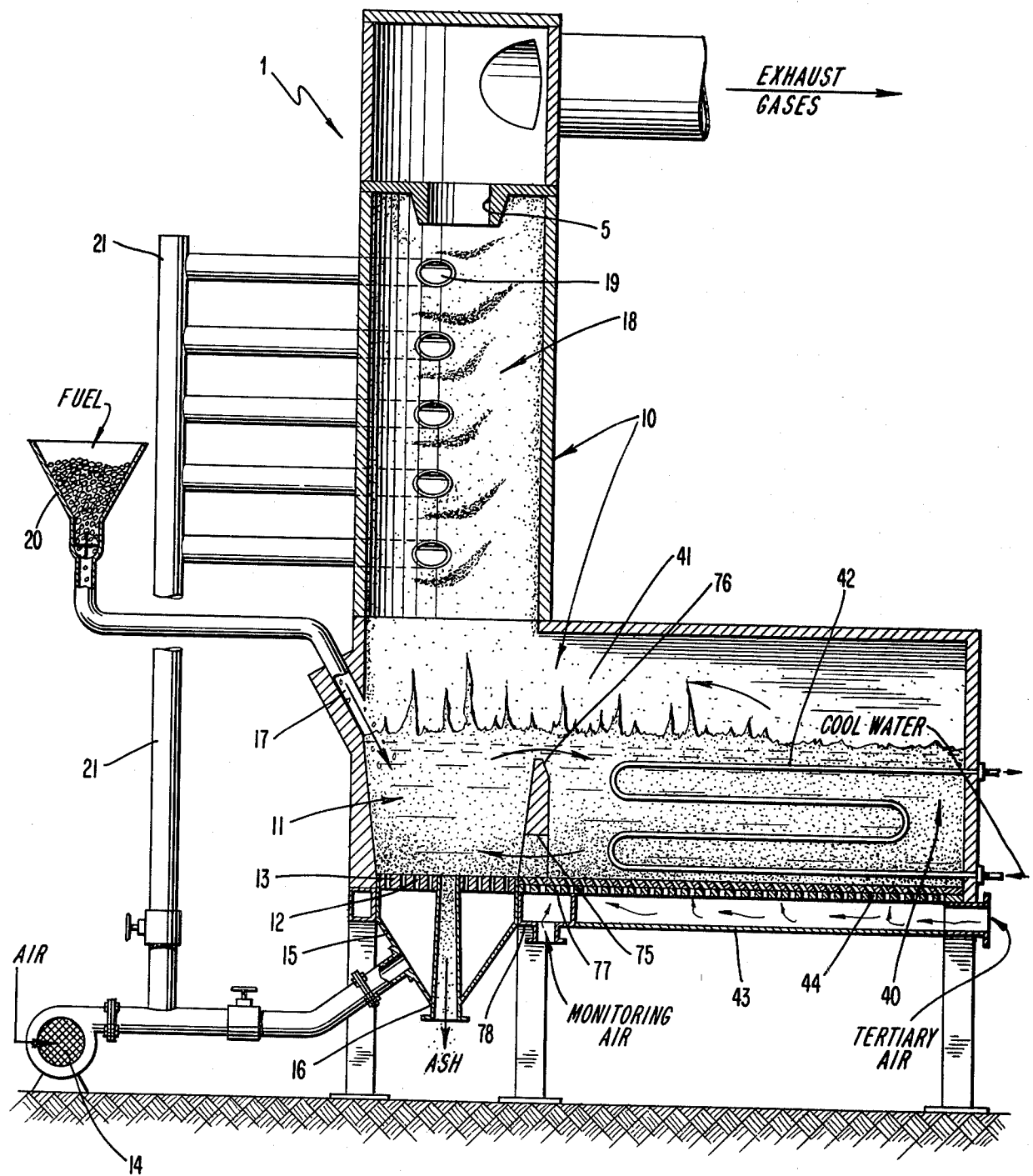

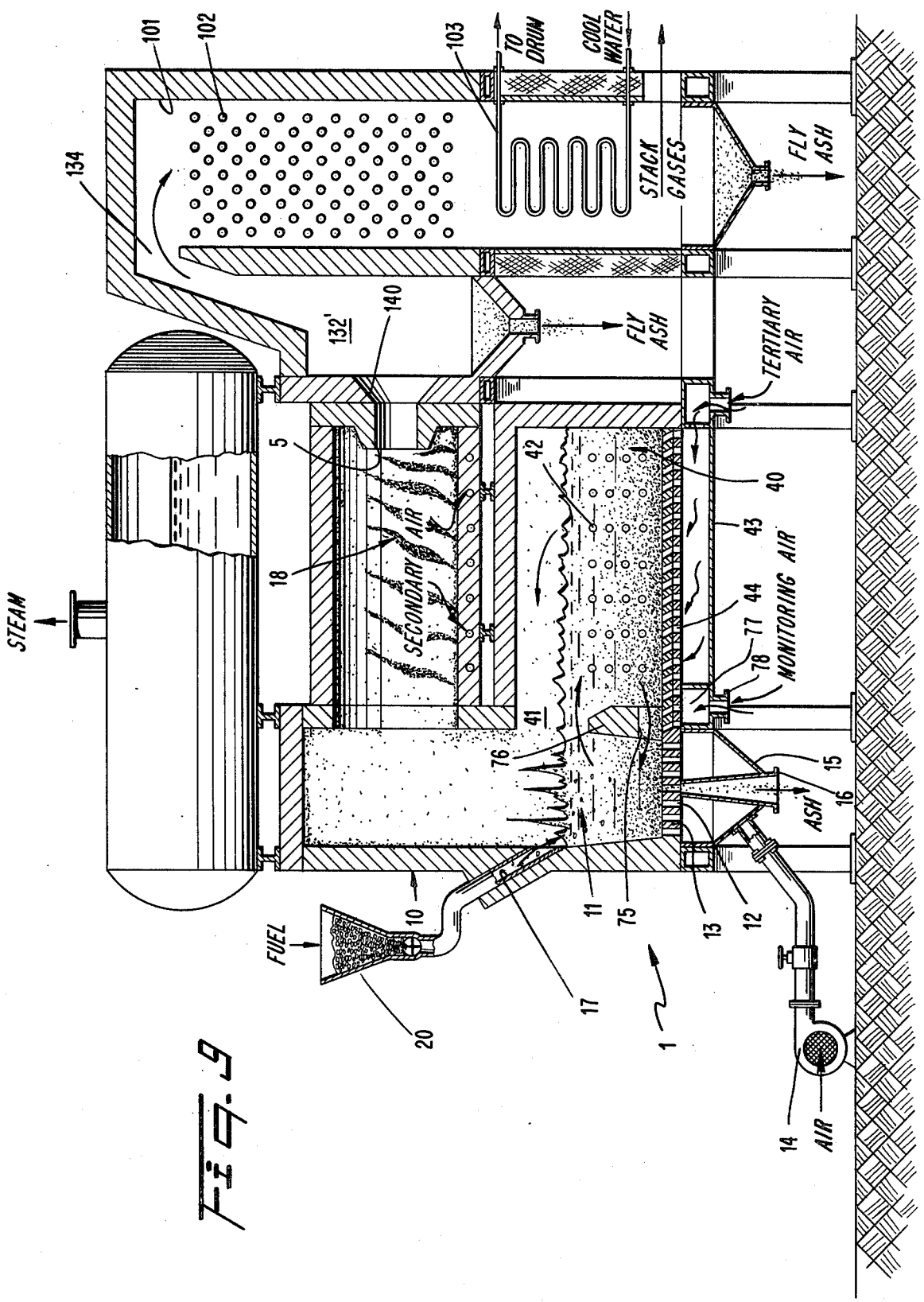

FAST FLUIDIZED BED REACTOR AND METHOD OF OPERATING THE REACTOR

BACKGROUND OF THE INVENTION

The present invention relates to an improved circulating, i.e., fast, fluidized bed reactor untilizing a cyclone of turbulent gases in the upper region of the reaction chamber, and to a method of operating the reactor; and, more particularly, to a reactor of this type in which the need for outer cyclone particle separators is eliminated.

The present invention has specific application, inter alia, to adiabatic fluidized bed combustors, fluidized bed boilers, and fluidized bed gasifiers. As used herein, and in the accompanying claims, "adiabatic combustor" denotes a fluidized bed combustor that does not contain internal cooling means, and "boiler" denotes a fluidized bed combustor that contains internal heat absorption means, in the form of immersed boiler, superheater, evaporator, and/or economizer heat exchange surfaces. The temperature of adiabatic fluidized bed combustors is typically controlled by the use of pressurized air in substantial excess of the stoichiometric amount needed for combustion. On the other hand, fluidized bed boilers require very low excess air, so that heat absorption means are required in the fluidized bed. Fluidized bed gasifiers, in contrast, utilize less than stoichiometric amounts of air.

The state of fluidization in a fluidized bed of solid particles is primarily dependent upon the diameter of the particles and the fluidizing gas velocity. At relatively low fluidizing gas velocities exceeding the minimum fluidizing velocity, e.g., a fluidization number in the range from about 2 to 10, the bed of particles is in what has been termed the "bubbling" regime. Historically, the term "fluidized bed" has denoted operation in the bubbling regime. This fluidization mode is generally characterized by a relatively dense bed having an essentially distinct upper bed surface, with little entrainment, or carryover, of the bed particles (solids) in the flue gas, so that recycling the solids is generally unnecessary. At higher fluidizing gas velocities, above those of the bubbling regime, the upper surface of the bed becomes progressively diffuse and carry-over of the solids increases, so that recirculation of solids using a particulate separator, e.g., a cyclone separator, becomes necessary in order to preserve a constant solids inventory in the bed.

The amount of solids carry-over depends upon the fluidizing gas velocity and the distance above the bed at which the carry-over occurs. If this distance is above the transfer disengaging height, carry-over is maintained at a constant level, as if the fluidizing gas were "saturated" with solids.

If the fluidizing gas velocity is increased above that of the bubbling regime, the bed then enters what has been termed the "turbulent" regime, and finally, the "fast," i.e., "circulating," regime. If a given solids inventory is maintained in the bed, and the fluidizing gas velocity is increased just above that of the turbulent regime, the bed density drops sharply over a narrow velocity range. Obviously, if a constant solids inventory is to be preserved in the bed, the recirculation, or return, of solids must equal the carry-over at "saturation."

At fluidizing gas velocities below those associated with the aforementioned sharp drop in bed density, the effect upon bed density of returning solids to the fluidized bed at a rate well above the "saturation" carry-over is not marked. The addition of solids to a bed fluidized in either the bubbling or turbulent regime at a rate above the saturation carry-over will simply cause the vessel containing the fluidized bed to fill up continually, while the fluidized density will remain substantially constant. However, at the higher fluidizing gas velocities associated with the fast regime, the fluidized density becomes a marked function of the solids recirculation rate.

Fast fluidized beds afford intimate contact between the high velocity fluidizing gas and a large inventory of solids surface per unit bed volume. Additionally, slip velocity (i.e., solids-fluidizing gas relative velocity) is relatively high in fast fluidized beds, when compared with that in ordinary fluidized beds. The combustion process which takes place in a fast fluidized bed combustor is also generally more intense, having a higher combustion rate, than that occurring in traditional fluidized bed combustors. Furthermore, as a result of the high solids recirculation rate in fast fluidized beds, the temperature is essentially uniform over the entire height of such combustors.

The higher combustion reaction rate, compared to that of ordinary fluidized bed combustors, allows the combustion temperature in fast fluidized bed combustors to be significantly reduced. Reduction of the combustion temperature may be accomplished, for example, by inserting heat exchanger tubes in the combustion region. Reducing the combustion temperature leads directly to a reduction in the total cost of constructing fast fluidized bed boilers, since (1) the total boiler heat exchange surface can be reduced, (2) thinner refractory liners are required, and (3) smaller cyclone separators can be installed. Moreover, contrary to prior art teachings, wet biomass materials may be combusted at such reduced combustion temperatures.

Notwithstanding the many advantages offered by fast fluidized bed reactors, as enumerated above, the high cost of constructing and maintaining the extremely large separation cyclone particle separators and large diameter standpipe required for recirculation of the entrained solids at the rate necessary to maintain the bed in the fast fluidization regime constitutes a severe economic impediment to widespread commercial utilization of such reactors. In this regard, prior art fast fluidized bed combustors are known which employ heat exchanger tube-lined walls in the entrainment region of the combustor (i.e., parallel to the flow). Such combustors rely primarily on the transfer of radiant heat from gases which typically are heavily laden with solids. Nevertheless, such combustors require an extremely large internal volume. Furthermore, still higher combustion rates are desired in fast fluidized bed boilers, with a concomitant reduction of the combustion temperature, and thus the size of the combustor so as to reduce the cost of construction.

In the past, cyclone combustors which produce a cyclone of turbulent gases within the combustion chamber have been employed for combusting various solid materials, including poor quality coal and vegetable refuse, as disclosed, for example, in "Combustion in Swirling Flows: A Review," N. Syred and J. M. Beer, *Combustion and Flame,* Vol. 23, pp. 143-201 (1974). Such cyclone combustors do not, however, involve the use of fluidized beds.

Although providing high specific heat release, prior art cyclone combustors suffer the following disadvantages: (1) the size of the usable fuel particles is limited to 0.25 inch (average effective diameter); (2) fuel moisture content is limited to about 3–5%; (3) at close to stoichiometric combustion, there is no means to control combustion temperature below the fusion point; and (4) erosion of refractory linings may occur in some instances.

Although the conventional fluidized bed incinerator system described in U.S. Pat. No. 4,075,953 to Sowards, for example, is provided with a vortex generator, this system does not exhibit the combustion characteristics associated with conventional prior art cyclone combustors. In particular, the specific heat release is quite low (about $0.2 \times 10^6$ Kcal per cubic meter per hour) and the Swirl number [defined in terms of combustor input and exit parameters as S=(Input Axial Flux of Angular Momentum)/(D$_e$/2×Exit Axial Flux of Linear Momentum), where $D_e$ is the combustor exit throat diameter] is no greater than about 0.07.

Likewise, while the conventional combustion furnace described in U.S. Pat. No. 4,159,000 employs tangentially disposed air inlets, it does not achieve the combustion characteristics of conventional cyclone combustors. For example, it exhibits a lower Reynolds number (as referred to herein, and in the claims, the Reynolds number is calculated on the basis of the gas velocity through the exit throat and the diameter of the exit throat) and lower specific heat release.

In conventional, i.e., non-circulating, fluidized bed reactors for combusting particulate material, the material to be combusted in fed over a bed of granular material, usually fuel ash or sand. In such reactors, it is desirable to be able to vary the amount of particulate material fed to the reactor and, concomitantly, the amount of pressurized air supplied to the reactor over as wide a range as possible. The hydrodynamic turndown ratio of a reactor, which is defined as the ratio of pressurized air flow at maximum reactor load to pressurized air flow at minimum reactor load, is a measure of the ability of a reactor to operate over the extremes of its load ranges. Notwithstanding the need for a fluidized bed reactor with turndown ratios in excess of 2 to 1, so as to improve the ability of the reactor to respond to varying power demands, the prior art has not satisfactorily provided a solution.

By way of example, prior art non-circulating fluidized bed boilers are known which employ an oxidizing fluidized bed for heat generation. In such boilers, relatively high heat releases and heat transfer directly from the fluidized bed material to heat exchange surfaces immersed therein serve to enhance the efficiency of the boiler, thereby reducing the boiler dimensions required to produce the desired thermal output, when compared with traditional boiler designs. Although high heat exchange efficiency is inherent in the operation of such oxidizing fluidized bed boilers, such boilers have a low turndown ratio, requiring a relatively narrow range in the variation of fuel consumption and heat output. These disadvantages have impeded wide-spread commercialization of such oxidizing fluidized bed boilers.

SUMMARY OF THE INVENTION

The present invention, in a radical departure from the conventional fast (circulating) fluidized bed reactors discussed above, has overcome the above-enumerated problems and disadvantages of the prior art by supplying pressurized air tangentially, referred to herein as "secondary" air, into the upper region (vapor space) of a circulating fluidized bed reactor so as to create a cyclone of high turbulence, whereby the reaction rate is significantly increased, and by eliminating the need for cyclone particle separators. As used herein, and in the accompanying claims, the term "vapor space" means the region of a circulating fluidized bed combustor where combustion of vapor occurs, accompanied by combustion of previously uncombusted solid carbon. This region is also known in the art as the "free board" region.

It is an object of the invention to provide a fast fluidized bed reactor utilizing a cyclone of turbulent gases in a cylindrically shaped upper region of the reactor so as to provide a more intense reaction, and therefore a significantly improved reaction rate, a lower reaction temperature (if required), and a higher specific heat release, compared to prior art circulating fluidized bed reactors. It is an additional object of the invention to provide a fast fluidized bed reactor of this type having a cylindrical exit throat which facilitates circulation of solids within the reactor and separation of the solids from the reaction gases, whereby the reaction gases exiting through the throat contain only a small amount of solids.

A further object is to provide a reactor having a shorter fluidizing gas residence time required to complete the reaction to the desired level. Specific heat releases in excess of about 1.5 million Kcal per cubic meter per hour are believed to be obtainable in fluidized bed combustion according to the present invention.

The foregoing advantages will permit a significant reduction in the size and, a fortiori, the cost of constructing the circulating fluidized bed reactor of the present invention. This will be true in adiabatic combustor, boiler, and gasification applications of the invention. It is anticipated, for example, that several times less internal volume will be required for a combustor constructed in accordance with the present invention, and for boiler applications, at least about 3–5 times less heat transfer surface area will be needed. Moreover, contrary to prior art teachings, web biomass materials may be combusted at the reduced combustion temperatures achievable in accordance with the present invention.

A further object of the invention is to provide a combustion system for burning combustible materials having a high moisture content and a wide particle size distribution, e.g., ranging from a few microns to tens of millimeters (effective diameter).

Still another object of the invention is to provide an improved boiler system having a high turndown ratio and easier start-up than prior art systems. It is an additional object of the invention in this regard to provide a separate cooling fluidized bed adjacent to the circulating fluidized bed reactor for cooling the solids. The cooling fluidized bed is preferably fluidized in the bubbling regime and contains boiler, superheater, evaporator, and/or economizer coils immersed in the bubbling fluidized bed, with the further objective of significantly reducing the heat exchanger surface area required for effective heat transfer. In such an overall system (circulating fluidized bed reactor and adjacent bubbling fluidized bed heat exchanger), it is a further objective to eliminate the vertical heat exchanger tube-lined walls previously utilized in the upper region (vapor space) of prior art circulating fluidized bed reactors, thereby considerably reducing the cost of constructing such a system.

To achieve the objects and in accordance with the purposes of the invention, as embodied and broadly described herein, a method of operating a fast fluidized bed reactor according to the invention comprises: (1) providing a fluidized bed reactor containing a bed of granular material and having an upper region and a lower region, the upper region having a cylindrically shaped interior surface and a cylindrically shaped exit throat aligned concentrically with the interior surface, the exit throat having a smaller diameter than that of the interior surface; (2) feeding matter to be reacted into the lower region of the reactor; (3) supplying a first stream of pressurized air to the reactor through a plurality of openings in the lower region at a sufficient velocity to fluidize the granular material in the circulating regime, whereby at least a portion of the granular material is continually entrained into the upper region; (4) tangentially supplying a second stream of pressurized air to the upper region of the reactor through at least one opening in the cylindrical interior surface, wherein, at maximum operating capacity for the reactor, the second stream of air constitutes in excess of about 50% of the total pressurized air fed to the reactor; (5) maintaining a Swirl number of at least about 0.6 and a Reynolds number of at least about 18,000 in the upper region for providing a cyclone of turbulence in the upper region which increases the rate of reaction in the reactor and creates at least one reverse flow zone in the upper region for returning at least a portion of the granular material to the lower region of the reactor; and (6) permitting the reaction gases in the upper region to exit from the reactor through the exit throat, while retaining substantially all of the granular material within the reactor.

Typically, the method of the present invention is performed in an adiabatic mode, in which the total pressurized air supplied is in excess of the stoichiometric amount needed for combustion or below the stoichiometric amount, i.e., for gasification conditions; or in a non-adiabatic mode in which a heat exchange surface is provided in the fluidized bed for removing heat from the bed.

In addition to the above-described method, the present invention is also directed to a fast fluidized bed reactor, comprising: (1) a fluidized bed reaction chamber for containing a bed of granular material, the chamber having an upper region and a lower region, the upper region having a cylindrically shaped interior surface and a cylindrically shaped exit throat aligned concentrically with the interior surface, the exit throat having a smaller diameter than that of the interior surface; (2) means for feeding matter to be reacted into the lower region of the chamber; (3) means for supplying a first stream of pressurized air to the chamber through a plurality of openings in the lower region at a sufficient velocity to fluidize the granular material in the circulating regime, whereby at least a portion of the granular material is continually entrained into the upper region; (4) means for tangentially supplying a second stream of pressurized air to the upper region of the chamber through at least one opening in the cylindrical interior surface, wherein at maximum operating capacity for the reactor, the second stream of air constitutes in excess of about 50% of the total pressurized air fed to the reactor, the second stream being supplied, and the chamber being constructed, in a manner adapted to provide a Swirl number of at least about 0.6 and a Reynolds number of at least about 18,000 in the upper region for providing a cyclone of turbulence in the upper region which increases the rate of reaction in the reactor and creates at least one reverse flow zone in the upper region for returning at least a portion of the granular material to the lower region of the chamber, and to permit the reaction gases in the upper region to exit from the chamber through the exit throat, while retaining substantially all of the granular material within the chamber.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 1 is a diagrammatic vertical section view of a fast fluidized bed reactor constructed in accordance with the present invention;

FIG. 2 is a diagrammatic vertical section view of a fast fluidized bed reactor constructed in accordance with the invention;

FIG. 3 is a schematic illustration of fluidizing air nozzles suitable for use in various embodiments of the invention;

FIG. 6a is a schematic illustration of a fluidizing air valving arrangement suitable for use in the sluice shown in FIG. 6; and FIGS. 7–9 are diagrammatic vertical section views of fast fluidized bed reactors constructed in accordance with further embodiments of the invention.

DESCRIPTION OF THE PREFERRED EMBODIMENTS

Figure 4:
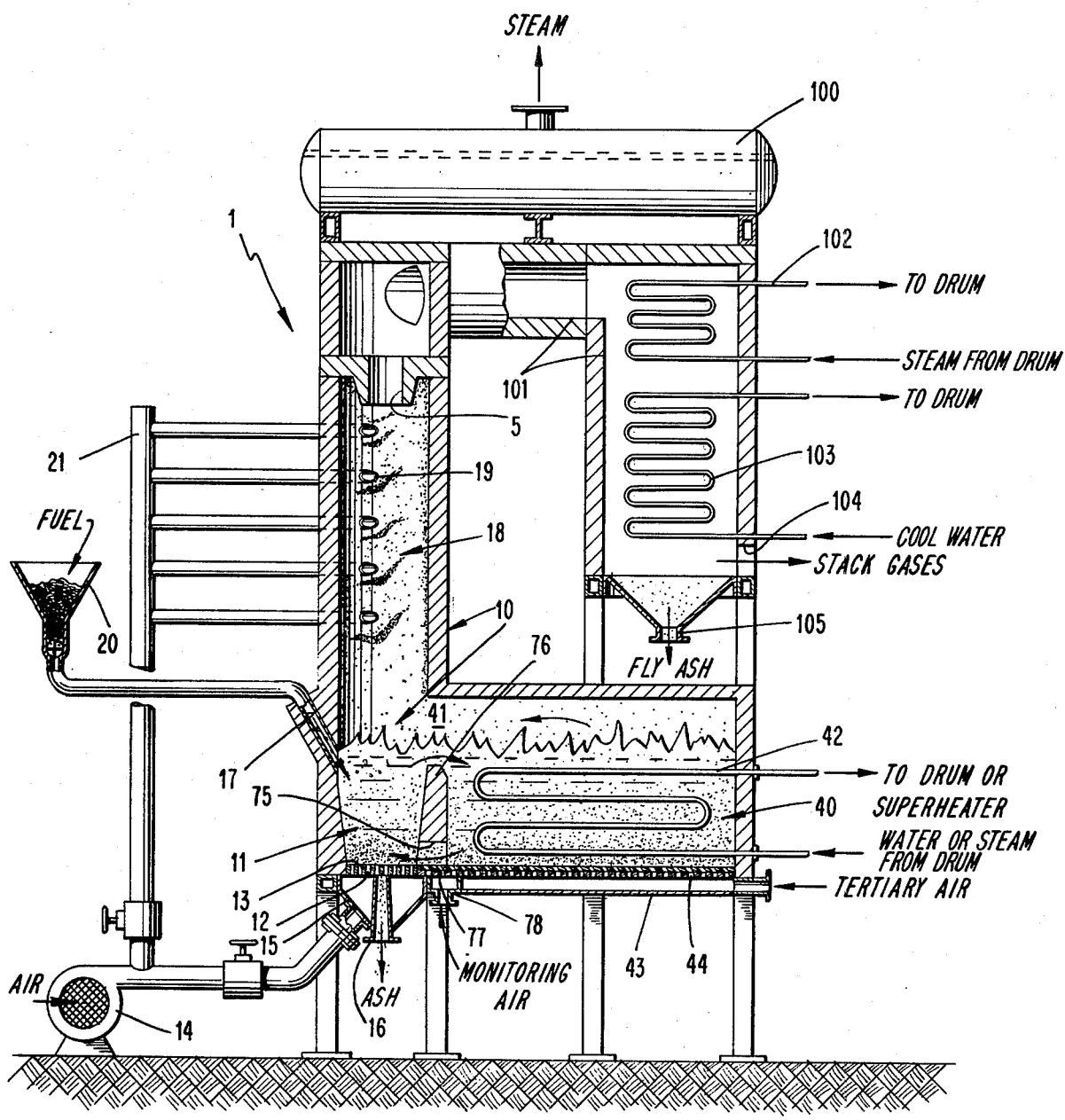
FIG. 4 is a diagrammatic vertical section view of a fast fluidized bed reactor according to a further embodiment of the invention.

Reference will now be made in detail to the presently preferred embodiments of the invention, examples of which are illustrated in the accompanying drawings.

One preferred embodiment of the fast (circulating) fluidized bed reactor of the present invention is shown in FIG. 1. As shown, the reactor of the present invention may comprise, for example, a combustor, represented generally by the numeral 1. In accordance with this embodiment of the invention, the combustor 1 includes a fluidized bed combustion chamber 10 containing a fluidized bed of granular material in its lower region 11. Preferably, the interior surface of lower region 11 is substantially conically shaped and the cross-sectional area of the bottom (d) of lower region 11 is smaller than that of upper region 18, as shown. As will be discussed more fully below, such a size and shape facilitates the obtaining of the required Swirl number, by permitting a reduction in the fluidizing gas flow, consequently, an increase in the "secondary" air. The granular bed material is preferably ash or sand, or another inert material.

The granular material is fluidized in the fast (circulating) fluidization regime with pressurized oxygen-containing gas (e.g., air), referred to herein as "primary" air, which is supplied as a stream through a plurality of openings 12 extending through support surface 13. As will be more fully discussed below, at maximum operating capacity for the combustor, the primary air supplied through openings 12 preferably constitutes less than about 50% of the total air supplied to combustion chamber 10, i.e., the air required for the combustion process. Openings 12 may comprise conventional pressurized air distribution apertures or nozzles. A source of pressurized air, e.g., blower 14, preferably feeds the air to a plenum chamber 15 beneath support surface 13. Chamber 15 supplies the air to openings 12. A separate conduit 16 extends through support surface 13 for removing refuse, such as tramp material and/or agglomerated ash, etc., from combustion chamber 10.

Combustor 1 further includes means for feeding combustible matter to the lower region 11 of combustion chamber 10 through inlet 17. As embodied herein, such means may comprise any suitable conventional mechanical feeding mechanism or, as shown, pneumatic feeder 20. The combustible matter, which may comprise particles of rather large effective diameter (e.g., coal particles on the order of 2.5 cm or wood chips on the order of about 5 cm), may be introduced into or above the fast fluidized bed, and undergoes complete drying, volatilization, decrepitation and partial combustion processes in the lower region 11 of combustion chamber 10 to an extent limited by the free oxygen available in the fluidizing gas. A portion of the granular bed material, unburnt fuel, gaseous volatile matter, solid carbon and ash is carried upward (i.e. entrained) by the flue gases into an upper region 18 of combustion chamber 10. A majority of the combustion taking place in combustion chamber 10 occurs in upper region 18.

In sharp contrast to prior art fast fluidized bed reactors, the fast fluidized bed reactor in accordance with the present invention does not require that the flue gases and the entrained granular bed material, including unburnt fuel, solid carbon, ash (solids), be directed into a solids-gas separator (e.g., a cyclone separator). Rather, as noted above, the entrained solids and gases are carried upward into the upper region 18 of combustion chamber 10, where further combustion takes place. Flue gases eventually exit from upper region 18 through cylindrical exit throat 5 which has a smaller cross-sectional area than that of upper region 18, as will be discussed below. Exit throat 5 facilitates separation of the granular bed material from the flue gases exiting therethrough, as well as facilitating circulation of the solids inside combustion chamber 10. When operating as an adiabatic combustor, the flue gases are then typically fed to a process heat supply or boiler as well. For example, they may be fed to kilns, veneer dryers, etc.

It is generally known that the quantity of particles transported by an ascending gas is a function of the gas flow velocity to the third to fourth power. Thus, greater solids reaction surface can be achieved by: (a) maintaining maximum solids' saturation in the ascending gas flow, and (b) increasing the vertical velocity of the fluidizing gas to a desired level sufficient to provide the desired carry-over from the fluidized bed into upper region 18. For any fuel having a given specific ash particle size distribution, this vertical gas velocity must be sufficiently high, as noted above, but must not be so high as to cause intensive erosion of the refractory liner, which is preferably provided on the interior surface of upper region 18, due to very high ash concentration in this region, as will be discussed below. The interior surface of upper region 18 is cylindrically shaped in order to achieve swirling flow in the upper region, as discussed more fully below.

In accordance with the invention, means are provided for tangentially supplying a second stream of pressurized air (referred to herein as "secondary" air) to the upper region 18 of combustor chamber 10 through at least one opening 19, and preferably at least two oppositely disposed openings 19. Still more preferably, a plurality of pairs of openings 19 are provided at several aggregate points in upper region 18. As shown in FIG. 1, in one advantageous embodiment the plurality of pairs of oppositely disposed openings are vertically aligned and spaced apart throughout upper region 18. (The cross-sectional view shown in FIG. 1 necessarily depicts only one opening of each pair of openings.)

As embodied herein, a source of pressurized air, e.g., conventional blower 14, feeds the secondary air to, for example, a vertical manifold 21. As will be discussed in greater detail in the ensuing paragraphs, at maximum combustor capacity, the secondary air preferably constitutes more than about 50% of the total air fed to combustor 1, i.e., the total air flow required for the combustion process. As will be brought out below, under certain limited circumstances, as, for example, when the temperature of the secondary air is above ambient, the secondary air may comprise somewhat less than 50%, e.g., about 30–40%, of the total air supplied.

In accordance with the invention, it is critical that the secondary air be supplied at a sufficient velocity, and that the geometric characteristics of the interior surface of upper region 18 be adapted, to provide a Swirl number (S) of at least about 0.6 and a Reynolds number (Re) of at least about 18,000, which are required to create a cyclone of turbulence in upper region 18. Preferably, the reactor of the present invention is constructed and operated in a manner adapted to yield these minimum values of Swirl number and Reynolds number when operating at minimum reactor capacity (i.e., on the order of 20% of maximum capacity), so that higher values can be obtained at maximum reactor capacity. On the other hand, the Swirl number and Reynolds number must not exceed those values which would result in an unacceptable pressure drop through combustion chamber 10.

It is this cyclone of tubulence which enables the reactor of the present invention to achieve specific heat release values higher than about 1.5 million Kcal per cubic meter per hour when utilized as a combustor, thereby significantly increasing the rate of combustion. As a result, the size of the combustor of the present invention can be significantly reduced, compared to prior art combustors which have a specific heat release of only about 0.2 million Kcal per cubic meter per hour.

Exit throat 5 and the interior of the upper region 18 of combustion chamber 10 must exhibit certain geometric characteristics, together with the applicable gas velocities, in order to provide the above-noted requisite Swirl number and Reynolds number. These features are explained below and are discussed generally in "Combustion in Swirling Flows: A Review," supra, and the references noted therein, which publications are hereby specifically incorporated herein by reference.

Fuel combustion is substantially completed in the cyclone of turbulence in upper region 18 at a temperature below the fusion point, which provides a friable ash condition.

Although the fluidized bed reactor of the present invention is fluidized in the "circulating" or "fast" fluidization regime, it differs fundamentally from prior art fast fluidized bed reactors, in that it does not require the use of a cyclone particle separator to effect separation of the flue gases from the solids carried thereby, e.g., the granular bed material, unburnt fuel, ash, etc. Rather, the cyclone of turbulence in upper region 18, and the accompanying large internal reverse flow zones created therein when the cylindrical exit throat 5 is appropriately sized (see below), effectively prevent all but the smallest solids (e.g., below about 2–4μ) from exiting from upper region 18 through exit throat 5. The elimination of such cyclone separators will significantly reduce the size and the cost of reactor systems constructed in accordance with the present invention.

In the embodiment shown in FIG. 1, the ash and unburnt fuel formed during combustion will necessarily be collected in the reactor 1, thus constantly increasing the height of the bed in lower region 11. As a result, it will be necessary to frequently bleed off these solids through conduit 16.

If combustion chamber 10 is designed and operated so as to achieve a Swirl number of at least about 0.6 and a Reynolds number of at least about 18,000 within upper region 18, and the ratio of the diameter of the reactor exit throat 5 (De) to the diameter of upper region 18 (Do), i.e., De/Do (defined herein as X), lies within the range of from about 0.4 to about 0.7, preferably about 0.5 to about 0.6, upper region 18 will, during operation, exhibit large internal reverse flow zones, with as many as three concentric toroidal recirculation zones being formed. Such recirculation zones are known generally in the field of conventional cyclone combustors (i.e., not involving fluidized beds), and reference is made to "Combustion in Swirling Flows: A Review", supra, and the references noted therein, for a general explanation of such phenomena. Such recirculation zones in upper region 18 act to return the solids to the lower region 11. This, coupled with the high level of turbulence in upper region 18, results in significantly improved solids-gas heat exchange and, therefore, a relatively uniform temperature throughout combustion chamber 10.

As mentioned, the combustion chamber 10 should be constructed such that the value of the ratio X lies within the range of from about 0.4 to about 0.7. The greater the value of X, the lesser the pressure drop through combustion chamber 10 and the greater the Swirl number; so that, generally, higher values of X are preferred. However, for values of X in excess of about 0.7, the internal reverse flow zones are not formed sufficiently to provide adequate gas-solids separation.

By way of illustrative hypothetical example, for a non-adiabatic combustor having a capacity ($Q_{com}$) of 7.9 million Kcal/hr, a combustion temperature ($T_{com}$) of 1123° K., a secondary (tangential) air temperature ($T_{air}$) of 573° K., and velocity ($W_{IN}$) of 73.2 m/sec, a specific heat release (q) of 2.5 million Kcal/hr, and a fluidized bed bottom gas velocity ($W_{FB}$) of 2.3 m/sec, and assuming combustion of coal having a relatively low moisture content, it can be shown that a Swirl number (S) in excess of 0.6, a Reynolds number (Re) in excess of 18,000, and an acceptable total pressure drop across the combustor 10 can be obtained if the combustor is properly designed and a large enough fraction ($\eta$) of the total air flow into the combustor 10 is introduced tangentially into upper region 18, i.e., as secondary air. Specifically, with reference to FIG. 1, it can be shown that:

$$S = \frac{(\phi \cdot \eta)^2 \cdot X}{Y} \cdot \frac{T_{air}}{T_{com}} \qquad (1)$$

$$\phi = \frac{\text{Air flow required for combustion above stoichiometric}}{\text{Combustion gas flow formed at combustion above stoichiometric}} \qquad (2)$$

$$Y = \frac{\text{Total cross-sectional area of tangential air inlets 19}}{\text{Horizontal Cross-sectional area of upper region 18}} \qquad (3)$$

$$X = \frac{\text{Diameter of reactor exit throat 5}}{\text{Diameter of upper region 18}} = \frac{D_e}{D_o} \qquad (4)$$

$$\eta = 1 - \frac{\tau \cdot W_{FB}}{f \cdot Z \cdot D_o} \qquad (5)$$

$\tau$ = Residence time of combustion gases in combustor 10 (sec) $\qquad$ (6)

$$f = \frac{\text{Cross-sectional area of region 18}}{\text{Cross-sectional area of fluidized bed bottom}} = \frac{D_o^2}{d^2} \qquad (7)$$

$d$ = Diameter of fluidized bed bottom $\qquad$ (8)

$$Z = \frac{\text{Length of upper region 18}}{\text{Diameter of upper region 18}} = \frac{L}{D_o} \qquad (9)$$

It can thus be shown that, for a fuel for which $\phi$ equals about 0.94 and which is combusted in such a nonadiabatic combustor 10 constructed and operated such that f=1.8, Z=3.3, $D_o$=1.069 m, $D_e$=0.641, Y=0.067 m²/0.897 m²=0.075, and the combustion chamber 10 inlet and outlet aerodynamic coefficients are 2 and 4, respectively, $\tau$ will then equal 0.308 sec, $\eta$ will equal 0.89, S will be 2.85, Re will be 250,075, and the total pressure drop through the combustor will be on the order of about 400 mm w.c., when the unit is operated at 100% capacity. When such a combustor is operated at 20% capacity, $\tau$ will be increased to a value of 1.54 sec, $\eta$ will become 0.445, S=0.714, Re=50,020, $W_{IN}$=14.8 m/sec and the total pressure drop will be about 16 mm w.c., provided the value of Y is kept constant and the combustion chamber 10 inlet and outlet aerodynamic coefficients are 2 and 4, respectively.

From the above analysis, and particularly equation No. 1, it can be seen that a reduction in the combustion temperature will facilitate the obtaining of the requisite Swirl number. This fact may be used to advantage in combusting wet biomass materials in accordance with the present invention at temperatures within the range of from about 500° C. to 1000° C., contrary to prior art teachings concerning the need for combustion temperatures on the order of about 1000° C.

As is also apparent from the equations set forth above, construction of combustion chamber 10 in a manner such that the cross-sectional area of the fluidized bed bottom is smaller than that of upper region 8 is preferred, since this will facilitate the obtaining of the requisite Swirl number. This is especially important when high moisture content fuel is used and when low pressure drops are desired. Moreover, the use of a smaller bottom cross-sectional area permits the use of higher bottom gas velocities, which, in turn, permits combustion of a fuel having larger particle sizes, while insuring that such particles can be fluidized in the bed.

In constructing a combustor in accordance with the present invention, it is clear from the above analysis that many parameters may be varied in order to achieve the requisite Swirl number and Reynolds number. For example, the values of the parameters X, Y, and Z can generally be adjusted as necessary, within the constraints imposed by the need to obtain an acceptably low pressure drop through the entire system, and within the constraints on the value of X discussed above. In this regard, it should be noted that the maximum acceptable pressure drop through a combustor is generally on the order of 500–1000 mm w.c. for wet biomass combustion, and somewhat higher for coal combustion. However, as a result of the improved heat transfer exhibited by the overall system of the present invention, a pressure drop of 1000 mm w.c. should also be achievable for coal combustion.

We have found, based on comparative analytical analysis of hypothetical constructions of the invention, that:

(1) The fraction ($\eta$) of the total air flow into the combustor which must be introduced tangentially as secondary air (via ports 19) in order to achieve the requisite Swirl number and Reynolds number can be reduced if the temperature of the secondary air ($T_{air}$) is increased. Similarly, $\eta$ is also reduced for fuels for which the value of $\phi$ is larger (e.g., for lower moisture content fuels). Specifically, from the above equations it can be shown that, under certain conditions, e.g., $T_{air}$=in excess of about 150° C. and $\phi=0.94$, only about 30% to 50% of the total air need be supplied as secondary air in order to achieve a Swirl number in excess of 0.6, when operating the combustor described above at 20% (i.e., at very low) capacity; although a value of $\eta$ in excess of about 0.5 is still required at maximum (at or about 100%) capacity. Furthermore, such a combustor will, as shown above, exhibit a lower total pressure drop.

(2) When the temperature ($T_{air}$) of the tangential air is near ambient, i.e., after passing through blower 14 (e.g., 40° C.), the tangential air must comprise in excess of about 50%, and preferably in excess of about 80%, of the total air flow into the combustor at 100% combustor capacity, and must comprise in excess of about 50% of the total air flow into the combustor, at the lowest partial combustor capacity desired (e.g., 20%).

(3) Items (1) and (2) above relate to the combustion of carbonaceous fuel in air. Slight variations can be expected for the reaction of materials other than those mentioned above in air or other gases. However, the criticality of maintaining a Swirl number in excess of about 0.6 and a Reynolds number in excess of about 18,000 will not change.

The present invention can be applied to most non-uniform combustible particulate solid materials, such as, for example, wood wastes, municipal refuse, carbonaceous matter (e.g., coal) and the like. However, it also can be used for liquid and gaseous fuel.

Additional beneficial features of the above-described embodiment of the invention include the following: (a) low temperature combustion can be utilized, if desired, as for example, in the combustion of biomass fuels at temperatures on the order of 500°–1000° C.; and (b) due to the fact that the fluidized bed in combustor 1 operates at the pneumatic transport gas velocity, which is tens of times higher than the terminal fluidizing velocity, the reduction of the combustor's capacity is practically unlimited, i.e., it lies beyond 5:1.

The method of the present invention can also be used for boiler applications which, from an economical standpoint, require low excess air for combustion and, therefore, heat absorption in the fluidized bed (lower region 11). In the boiler embodiments of the invention, the cross section of lower region 11 is preferably of quadrangular shape and of a larger size, in order to accommodate a heat exchange surface of reasonable size in the fluidized bed volume. This is particularly so when the combustion temperature and/or the fuel moisture content are low. As shown in the dashed lines in FIG. 1, the heat exchange surface may, for example, comprise a heat exchanger tube arrangement 29 in lower region 11. The tube arrangement may be of any suitable size, shape and alignment (including vertical tubes), as is well known in the art. Preferably, heat exchanger tube arrangement 29 will be operatively connected to a process heat supply or to a conventional boiler drum, not shown. The heat exchanger cooling media may comprise any suitable conventional liquid or gaseous media, such as, for example, air. In boiler applications, the exhaust gases exiting from reactor exit throat 5 are preferably fed to a boiler convective tube bank (not shown) in a conventional manner.

Turning now to FIG. 2, this figure illustrates an embodiment of the invention particularly suitable for use in boiler applications in which a high boiler turndown ratio is desired. Like reference numerals have been used in FIG. 2 to identify elements identical, or substantially identical, to those depicted in FIG. 1, and only those structural and operational features which serve to distinguish the embodiment shown in FIG. 2 from those shown in FIG. 1 will be described below.

In particular, the embodiment shown in FIG. 2 includes a cooling fluidized bed 40 (with a heat exchanger) situated immediately adjacent to the lower region 11 of combustion chamber 10 and having an overflow opening 41 communicating with lower region 11. Cooling fluidized bed 40 comprises an ordinary (i.e., bubbling) fluidized bed of granular material, and includes a heat exchange surface, shown here as heat exchanger tube arrangement 42, which contains water or another coolant fluid, such as, for example, steam, compressed air, or the like. The fluid entering tube arrangement 42 is preferably supplied from a conventional boiler steam drum (not shown). The bed is fluidized by tertiary pressurized air supplied from a plenum 43 through openings 44 in a support surface. These openings may take the form of nozzles.

Fluidized bed 40 is comprised of the granular material and other solids overflowing from lower region 11 into bed 40 through opening 41, as will be explained below. Heat exchanger tube arrangement 42 functions as a cooling coil to cool fluidized bed 40. The cooled solids leave bed 40 through an orifice 75 extending through the bottom part of the partition 76, which separates bed 40 from the fast fluidized bed contained in lower region 11, and re-enter lower region 11 of reactor chamber 10 to be again fluidized therein. The fluid passing through tube arrangement 42 is consequently heated and preferably fed, for example, to a conventional boiler drum (not shown).

The movement of solids from fluidized bed 40 to the fast fluidized bed in lower region 11 of combustion chamber 10 is motivated by specially oriented tertiary air jet nozzles 44 and monitoring air jet nozzles 77. Monitoring nozzles 77 may be supplied from a separate plenum 78. Preferably, nozzles 44 and 77 will be constructed as shown in FIG. 3, with the tapered end of each nozzle being directed at an angle toward lower region 11 (see also FIG. 2).

For a better understanding of how this boiler embodiment functions to improve the turndown ratio, a preferred procedure for initially placing it into operation from the cold condition to a full load and then turn it down to a desired level will be explained.

The ignition burner (not shown), preferably located above the lower region 11, is turned on, while primary, secondary, tertiary and monitoring air are shut off. When the combustor's refractory and its internal volume temperature exceed the solid fuel ignition temperature, the primary air and secondary air are partially turned on, while the tertiary and monitoring air remain shut off. From this moment, an adiabatic fluidized bed combustor scheme is in operation in reactor chamber 10, and when the temperature again exceeds the solid fuel ignition temperature, solid fuel is fed into combustion chamber 10. After the solid fuel is ignited and, consequently, the combustor's exit gas temperature has risen, the monitoring air is then turned on. To keep the combustion temperature on the rise, at this time the secondary air flow is gradually increased, with a simultaneous increase in the solid fuel feed rate, and the ignition burner is shut off. If the gas exit temperature continues to rise, a further increase in the secondary air flow and fuel feed rate should be pursued. At the point when the gas exit temperature achieves its highest designed level, the tertiary air flow is turned on and continuously increased until it reaches its full rate. Simultaneously, the fuel feed rate and the secondary air flow are also continuously increased. At this moment, if the gas exit temperature is at the desired, i.e., design, level, the secondary air flow and fuel rate are not increased any further, and are then maintained in accordance with the fuel-air ratio required to obtain the most economical fuel combustion. At this point, the reactor can be considered as having full load (100% capacity).

The minimum capacity of the reactor, i.e., desired turndown ratio, can be obtained if the sequence of operations outlined above is followed in reverse order, until the point where the ignition burner is shut off. Namely, while maintaining the desired fuel-air ratio, the secondary air flow is reduced until the lowest acceptable temperature level in combustion chamber 10 (i.e., the lowest level at which complete combustion can be maintained) is reached. Further reduction in the unit's capacity is achieved by gradually decreasing the monitoring and tertiary air flows, in that order. As a result, the solids' circulation through cooling fluidized bed 40 would be reduced to a minimum, and likewise the heat exchange process between bed 40 and heat exchanger tubes 42. Moreover, by changing the monitoring and/or tertiary air flows, the combustion temperature in chamber 10 can be further controlled at any desired combustor capacity (including maximum capacity, provided the surface of heat exchanger 42 has been over designed, i.e., so as to handle more than the amount of heat transfer normally contemplated).

In brief review, the key feature, in terms of obtaining a high turndown ratio according to the embodiment depicted in FIG. 2, is the fact that the cooling fluidized bed heat exchange surface 42 may be gradually pulled out (but not physically) from the combustion process so as to keep the fuel-air ratio and combustion temperature at the required levels. Further, by virtue of the fact that the fluidized bed of the combustor chamber 10 operate at the pneumatic transport gas velocity (recirculation of most of its inventory) and is fluidized by air flow of much less than 50% (generally less than 20%) of the total air flow, the turndown ratio, from a hydrodynamic standpoint, is practically unlimited, i.e., lies beyond 5:1.

Furthermore, the above-desired boiler turndown ratio improvement has an additional advantage over known circulating fluidized bed boilers. Specifically, it requires less than one-half the heat exchange surface to absorb excessive heat from the circulating fluidized bed, due to the following: (a) the tubular surface 42 fully immersed in fluidized bed 40 is fully exposed to the heat exchange process, versus the vertical tube-lined walls in the upper region of the combustion chamber of prior art circulating fluidized bed boilers, in which only 50% of the tube surface is used in the heat exchange process; (b) the fluidized bed heat exchange coefficient in such a system is higher than that for gases, even heavily loaded with dust, and vertical tube-lined walls confining the combustion chamber of prior art circulating fluidized bed boilers. The latter fact results, in part, from the fact that it is possible, by using a separate fluidized bed 40, to utilize the optimum fluidization velocity therein, and the fact that fluidized bed 40 is comprised of small particles, e.g., fly ash.

FIG. 4 illustrates a further boiler embodiment of the invention generaly similar in structure and operation to the embodiment shown in FIG. 2. This embodiment preferably can be used for applications requiring a higher capacity. The higher capacity results from the construction of the FIG. 4 embodiment as a high pressure, water tube boiler in which heat exchanger tube arrangement 42 is comprised of water tubes supplied with water from boiler drum 100, with the steam generated in water tube arrangement 42 being supplied to boiler drum 100 or optionally to a superheater (e.g., superheater 102). In the preferred embodiment shown, boiler drum 100 is situated above combustion chamber 10.

Like reference numerals are used in FIG. 4 to identify elements identical, or substantially identical, depicted in FIG. 2. Moreover, only those structural and operational features which serve to distinguish the embodiment shown in FIG. 4 from that shown in FIG. 2 will be discussed below.

In particular, in the embodiment shown in FIG. 4, a refractory-lined duct 101 is fluidly connected to combustion chamber exit throat 5 for conducting flue gases away from combustion chamber 10. Preferably, heat exchange surfaces are provided in duct 101 to recover heat from the flue gases. For example, a bank of superheater steam tubes 102 may be positioned in duct 101 as shown, and steam from boiler drum 100 may be fed thereto. Alternatively, or conjunctively, tubes 102 might comprise a conventional evaporative convective surface.

Preferably, a bank of economizer and/or air heater tubes 103 are positioned in duct 101 following tubes 102. The output of the economizer would preferably be supplied to boiler drum 100, while the output of the air heater would, for example, be utilized as the secondary air supply. After passing tube banks 102 and 103, the flue gases exit from duct 101 via opening 104. Fly ash is collected at the end of duct 101 as shown, and is removed via port 105.

Figure 5:
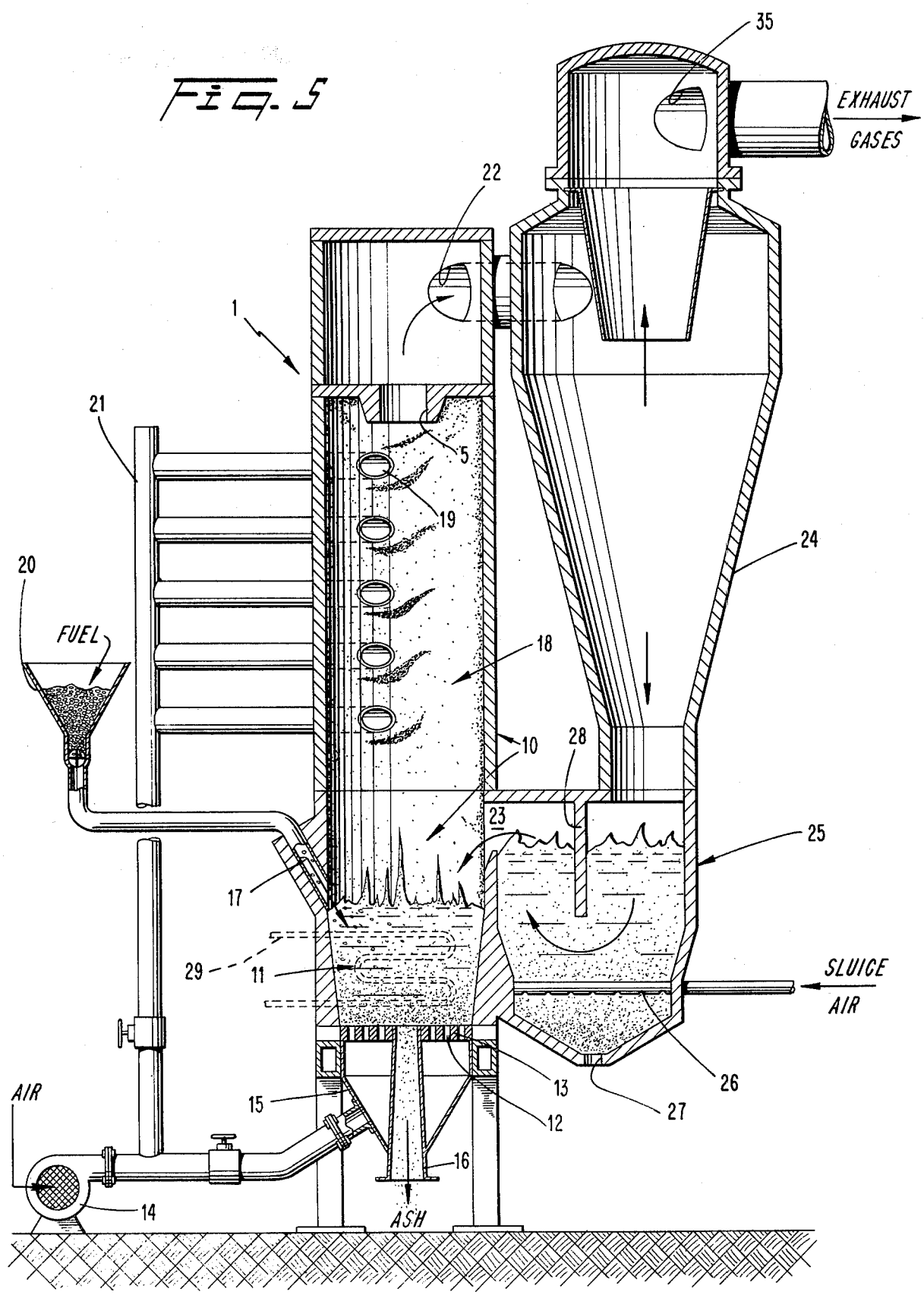
FIGS. 5 and 6 are diagrammatic vertical section views of fast fluidized bed reactors constructed in accordance with further embodiments of the invention having an optional external cyclone particle separator.
Figure 6:
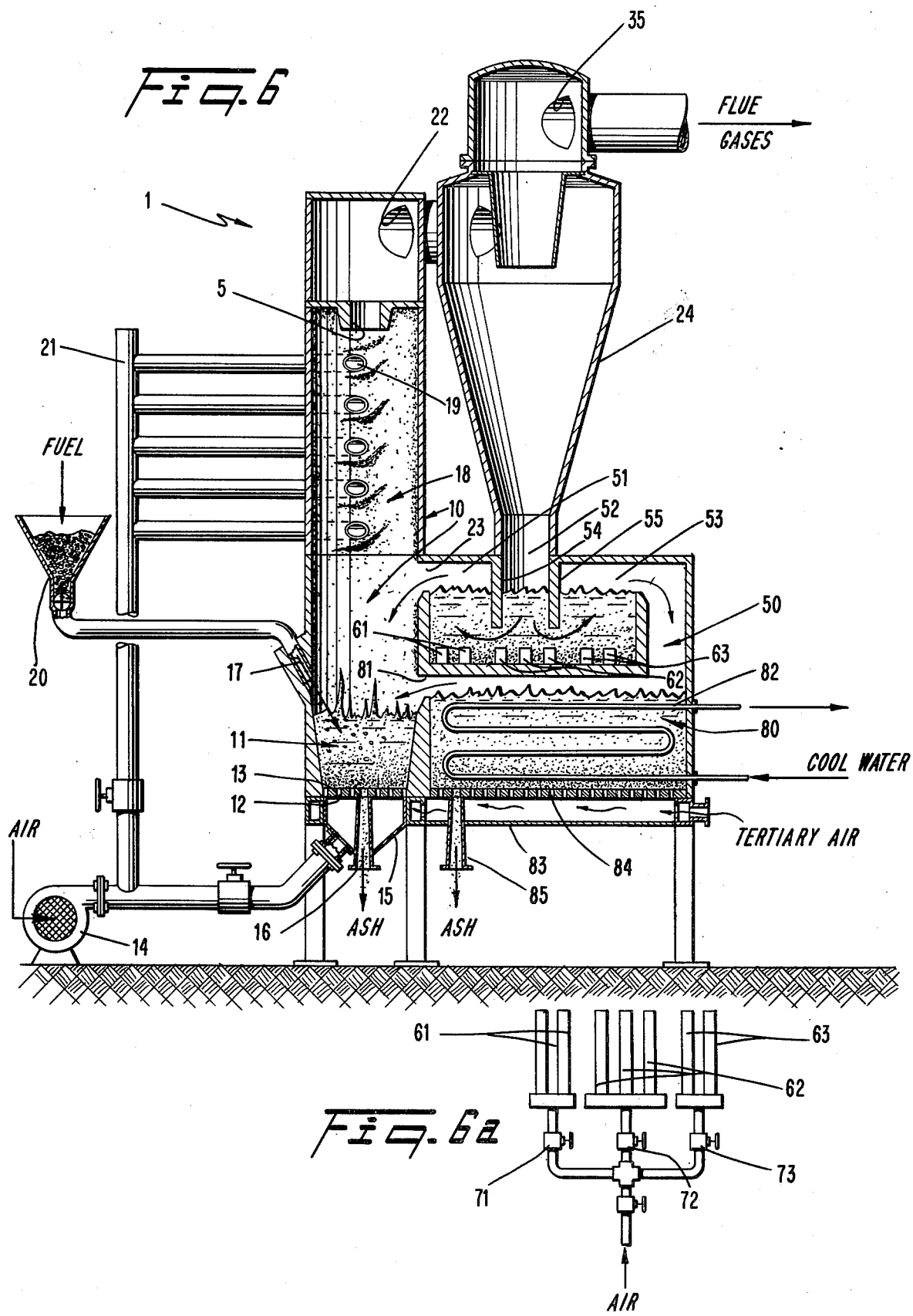

In those applications of the invention where it is desired to burn fuel particles which are extremely fine, high in ash content and/or difficult to combust, the flue gases exiting from combustion chamber 10 through exit throat 5 may be laden with solids to such an extent that conventional cyclone particle separators are required to remove them. FIGS. 5 and 6 illustrate adiabatic and non-adiabatic combustors, respectively, constructed in accordance with the invention for use in such applications.

In accordance with the embodiment of the invention shown in FIG. 5, combustor 1 further comprises means for separating the small fraction of solids exiting from upper region 18 through exit port 22 located above exit throat 5, and returning the separated material to the lower region 11 of combustor chamber 10 via inlet port 23. As embodied herein, such means for separating the solids from the combustion gases includes a suitable conventional cyclone separator 24 (or a plurality thereof) operatively connected between inlet port 23 and exit port 22. Flue gases exit from cyclone separator 24 through port 35, and are then typically fed to the process heat supply or boiler, as the case may be.

Preferably, the separated granular material is not fed directly from cyclone separator 24 to inlet port 23, but, instead, enters a sluice 25 operatively connected between separator 24 and port 23. Sluice 25 includes a standard, i.e., bubbling, fluidized bed comprised of the separated material. The separated material is fluidized with pressurized air supplied through a plurality of openings 26, and over-flows through inlet port 23 into the fluidized bed in lower region 11 of combustor chamber 10. Ash and tramp material may be removed through port 27 as needed. Sluice 25 contains a solid partition 28 for eliminating cross flow of gases between the lower region 11, combustor chamber 10 and cyclone separator 24. Since the fluidized bed acts as a liquid, sluice 25 operates in the same manner as a conventional liquid trap, and functions primarily to prevent the primary and secondary air supplied to reactor chamber 10 from bypassing upper region 18 of reactor chamber 10.

Turning now to FIG. 6, this figure illustrates a further embodiment of the invention generally similar in structure and operation to the embodiments shown in FIG. 5, but having a significantly higher turndown ratio. Like reference numerals have been used in FIG. 6 to identify elements identical, or substantially identical, to those depicted in FIG. 5. Only those structural and operational features which serve to distinguish the embodiment shown in FIG. 6 from that shown in FIG. 5 will be described below.

In particular, the embodiment shown in FIGS. 6 and 6a includes a cooling fluidized bed 80 (with a heat exchanger) situated immediately adjacent to the lower region 11 of combustion chamber 10 and having an overflow opening 81 communicating with lower region 11. Cooling fluidized bed 80 comprises an ordinary (i.e., bubbling) fluidized bed of granular material, and includes a heat exchange surface, shown here as heat exchanger tube arrangement 82, which contains water or another fluid, such as, for example, steam, compressed air, or the like. The fluid entering tube arrangement 82 is preferably supplied from a conventional boiler steam drum (not shown). The bed is fluidized in a conventional manner by tertiary pressurized air supplied from a plenum 83 through openings 84 in a support surface, and ashes are removed (when required) through conduit 85.

The fluidized bed is comprised of the granular material and other solids separated in cyclone separator 24. Heat exchanger tube arrangement 82 functions as a cooling coil to cool the fluidized bed, with the cooled solids overflowing the bed through opening 81 and re-entering lower portion 11 of reactor chamber 10 to be again fluidized therein. The fluid passing through tube arrangement 82 is consequently heated and preferably fed, for example, to a conventional boiler drum (not shown) in a steam generation process.

The embodiment illustrated in FIGS. 6 and 6a further includes a modified fluidized bed sluice 50 which is divided into three compartments 51, 52 and 53 by substantially solid partitions 54 and 55. Each of these compartments is fluidized in a conventional manner by a separate, regulatable stream of pressurized fluidizing air from separate fluidizing aperture systems 61, 62, and 63, respectively (see FIG. 6a). Aperture systems 61, 62 and 63 are regulated by separate valves 71, 72, and 73, respectively. Compartments 51 and 52, together, function in the same manner as sluice 25 (FIG. 5), described above, to prevent cross flow of gases, with the separated solids from cyclone separator 24 entering compartment 52 and being overflowed from compartment 51 through opening 23 into the fluidized bed in lower region 11 of reactor chamber 10. However, as will be described below, when the fluidized bed reactor 10 is in normal operation (functioning at full or partial loads), compartment 51 is not fluidized, and therefore plays no role in the recirculation of solids.

In normal operation, compartments 52 and 53, but not 51, are fluidized, i.e., valves 72 and 73 are open and valve 71 is closed. As a result, separated solids enter compartment 52 and overflow into cooling fluidized bed 80 as shown.

For a better understanding of how this embodiment functions to improve the turndown ratio, a preferred procedure for initially placing it into operation from the cold condition to a full load and then turn it down to a desired level will be explained.

The ignition burner (not shown), preferably located above the lower region 11, is turned on, while primary, secondary, tertiary and sluice air are shut off. At the time when the combustor's refractory and its internal volume temperature exceed the solid fuel ignition temperature, the primary air, secondary air and sluice air are partially turned on, while compartment 53 of sluice 50 remains shut off (valve 73 is closed, FIG. 6a). From this moment, an adiabatic fluidized bed combustor scheme is in operation in reactor chamber 10, and when the temperature again exceeds the solid fuel ignition temperature, solid fuel is fed into a reactor chamber 10. After the solid fuel is ignited and, consequently, the exit gas temperature has risen, additional sluice air is then supplied to compartment 53 (by opening valve 73), and a fraction of the tertiary air is supplied. To keep the combustion temperature on the rise, at this time the secondary air flow is gradually increased, with a simultaneous increase in the solid fuel feed rate, and the ignition burner is shut off. If the gas exit temperature continues to rise, a further increase of secondary air flow and fuel feed rate should be pursued. At the point when the gas exit temperature achieves its highest designed level, the tertiary air flow rate must be continuously increased until it reaches its full rate. Simultaneously, the fuel rate and secondary air rate are also continuously increased. To achieve full load, the sluice compartment 51 air flow valve 71 (FIG. 6a) is closed until it is completely shut off. At this moment, if the gas exit temperature is at the desired level, the secondary air flow and fuel rate are not increased any further, and are then maintained in accordance with the fuel-air ratio required to obtain the most economical fuel combustion. At this point, the reactor can be considered as having full load (100% capacity). The minimum capacity of the reactor, i.e., desired turndown ratio, can be obtained if the sequence of operations outlined above is followed in reverse order, until the point where the ignition burner is shut off. By changing the sluice air flow in compartment 51 (by fully or partially closing valve 71, corresponding to the desired combustion temperature) and by changing the tertiary air flow, the combustion temperature can be further controlled at any desired combustor capacity (including maximum capacity, provided the surface of heat exchanger 42 has been over designed, i.e., so as to handle more than the amount of heat transfer normally contemplated).

In brief review, the key feature, in terms of obtaining a high turndown ratio according to the embodiment depicted in FIGS. 6 and 6a, is the fact that the cooling fluidized bed heat exchange surface 82 may be gradually pulled out (but not physically) from the combustion process so as to keep the fuel-air ratio and combustion temperature at the required levels. Further, in addition, due to the fact that the fluidized bed of the reactor chamber operates at the pneumatic transport gas velocity (recirculation of most of its inventory) and is fluidized by air flow of much less than 50% (generally less than 20%) of the total air flow, the turndown ratio, from a hydrodynamic standpoint, is practically unlimited, i.e., lies beyond 5:1.

Figure 7:
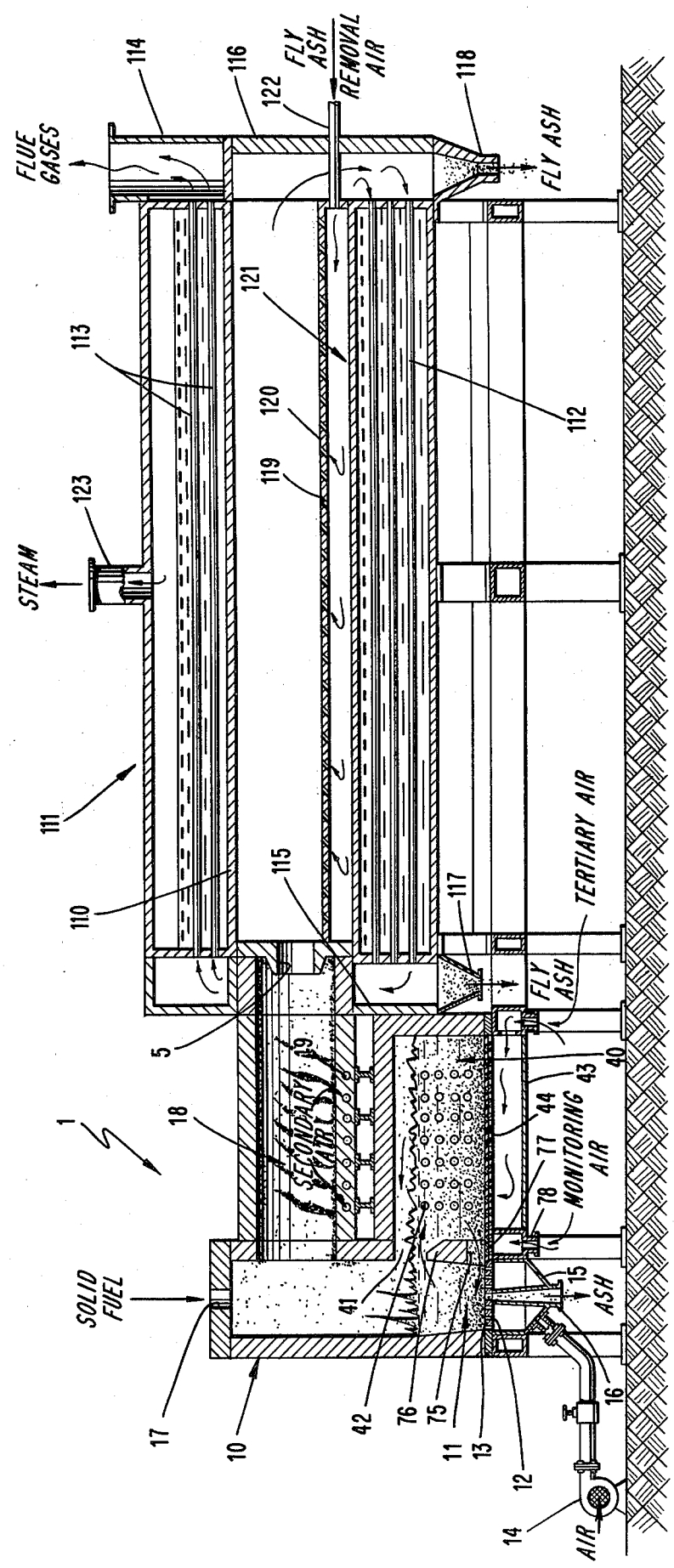
Figure 8:
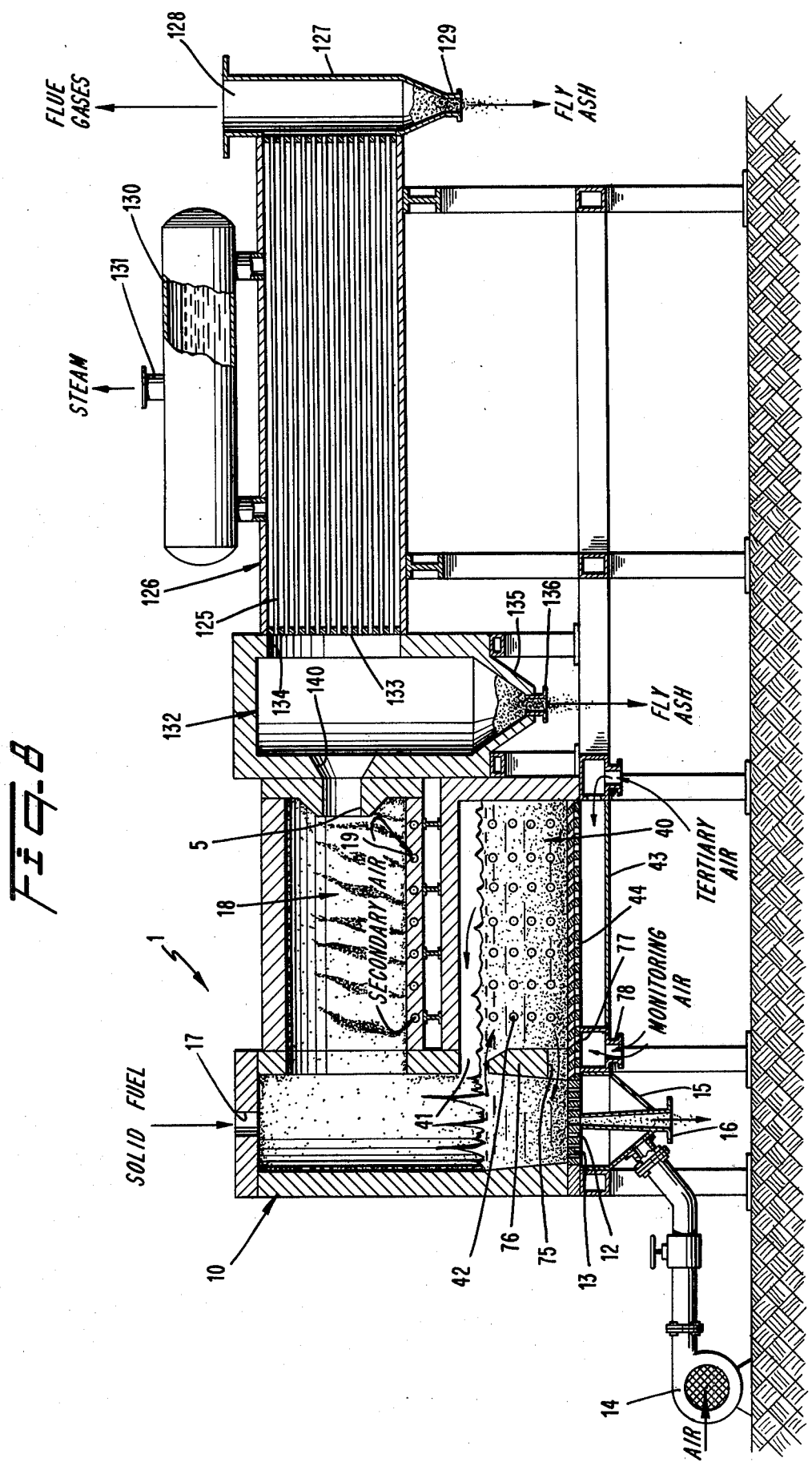

FIGS. 7, 8 and 9 illustrate further boiler embodiments of the invention similar in many respects to the embodiment shown in FIG. 2, but having the longitudinal axis of the upper, cylindrical region 18 aligned substantially horizontally. Embodiments of the type shown in FIGS. 7 and 8 are preferable for medium size boiler applications, while the embodiment shown in FIG. 9 is suitable for boilers of substantially any capacity.

Like reference numerals are used in FIGS. 7-9 to identify elements identical, or substantially identical, to those depicted in FIGS. 1-6. Moreover, only those structural and operational features which serve to distinguish the embodiments shown in FIGS. 7-9 from those shown in FIGS. 1-6 will be discussed below.

FIG. 7 shows an embodiment of the invention involving a low pressure gas tube boiler (less than 300 psi) of medium capacity having a high turndown ratio. The fast fluidized bed in lower region 11 of combustor chamber 10 and the adjacent cooling fluidized bed 40, and the monitoring and tertiary air, function in the same manner as previously described. Upper region 18 is situated horizontally above fluidized bed 40, as shown, with the secondary air supplied tangentially via openings 19 from a manifold (not shown), as previously described (see, e.g., FIGS. 1, 2 and 4-6). The exit throat 5 of upper region 18 is fluidly connected to the central, fire tube 110 of a generally conventional fire tube boiler 111. Preferably, the outer diameter of upper region 18 and the inner diameter of fire tube 110 are approximately the same size, so that the end portion of upper region 18 will fit within, or otherwise sealingly engage with, fire tube 110.

The flue gases exiting from exit throat 5 pass into fire tube 110 and then along the tube, as indicated by the arrows. Then they pass into and along a first bank of tubes 112 in the lower portion of boiler 111, as shown by the arrows, and thence into and along a second bank of tubes 113 in the upper portion of the boiler, again as shown by the arrows. Upon passing through tubes 113, the flue gases exit from boiler 111 via duct 114, where they may be released to the atmosphere as stack gases or optionally further utilized, as, for example, by being supplied to a conventional economizer. The ends 115, 116 of boiler 111 are preferably constructed so as to facilitate the collection and removal of fly ash from boiler 111 and to facilitate the above-described flue gas flow pattern. This may include, for example, the provision of fly ash disposal conduits 117, 118, as shown.

Preferably, the removal of fly ash from boiler 111 is further enhanced by passing pressurized air through jets 119 located in a flat plate 120 which is sealingly engaged in the bottom portion of fire tube 110 as shown. Plate 120 contains a plurality of nozzles or jets 119 which may be constructed similarly to nozzles 12 (see FIG. 3). As shown, the jets 119 are preferably angled so as to direct the pressurized air in the general direction of end 116, thereby directing the fly ash along and out of fire tube 110. Plate 120 and the bottom portion of fire tube 110, together, form a plenum chamber 121 of segmental cross section. Plenum chamber 121 is fed by any suitable pressurized air supply (not shown) through pipe 122.

The steam which is generated in boiler 111 exits from the boiler through port 123 and then may be utilized directly or optionally fed to a superheater (not shown).

The horizontal alignment of upper region 18 of combustion chamber 10 in the embodiment shown in FIG. 7 renders it particularly attractive for retrofitting to previously installed fire tube boilers.

FIG. 8 illustrates a medium capacity, high pressure (600-700 psi or higher), high turn down ratio, gas tube boiler embodiment of the invention similar in many respects to the embodiment shown in FIG. 7. Only those structural and operational features which serve to distinguish this embodiment from that shown in FIG. 7 will be discussed below.

In the embodiment shown in FIG. 8, flue gases exiting from combustion chamber 10 through exit throat 5 are fed into the gas tubes 125 of one-pass gas tube boiler 126. After passing through tubes 125, the gases exit into fly ash collector 127 located at the end of tubes 125 for collecting fly ash. The ash is removed from collector 127 via duct 129. The flue gases pass into collector 127 and exit through port 128, thence being released to the atmosphere as stack gases or optionally further utilized, for example, in a conventional economizer.

As shown in FIG. 8, steam is preferably collected in drum 130, which is fluidly connected to boiler 126. Steam from drum 130 exits through port 131 and is either utilized directly or fed to a superheater (not shown). The shell of gas tube boiler 126 is smaller in size than the corresponding shell of the fire tube boiler shown in FIG. 7, thus facilitating the design of a high pressure boiler having a shell of reasonable thickness.

In the embodiment shown in FIG. 8, the turbulently flowing flue gases exiting from combustion chamber 10 through exit throat 5 are fed directly into an adjacent straightening chamber 132 through opening 140 which is sealingly engaged to exit throat 5. Straightening chamber 132 serves the purpose of substantially reducing the turbulence and substantially straightening the flow of the flue gases so as to direct them more uniformly in a single, linear direction coinciding generally with the longitudinal axes of gas tubes 125, into which the flue gases are to be fed. In addition to facilitating passage of the flue gases through tubes 125, such alignment will serve to substantially equalize the amounts of solids, if any, deposited from the flue gases in each of the tubes 125. Straightening chamber 132 must be of a sufficient size to achieve the above-stated purposes.

The front end 133 of boiler 126 is sealingly engaged with opening 134 in straightening chamber 132, as shown, so that the "straightened" flue gases are directed into gas tubes 125. Straightening chamber 132 is provided with a fly ash collector 135, which is preferably tapered as shown, and fly ash is removed from the collector via duct 136 as necessary. The removal of solids from the flue gases is another important feature of straightening chamber 132.

FIG. 9 illustrates a high capacity, high turn down ratio, water tube boiler embodiment of the invention suitable for operation at any conventional pressure level (high or low). This embodiment is quite similar to the embodiment depicted in FIG. 4, except that upper region 18 of combustion chamber 10 is aligned substantially horizontally in the embodiment shown in FIG. 9. Therefore, only these features serving to distinguish this embodiment from that shown in FIG. 4 will be discussed below.

As mentioned, in the embodiment shown in FIG. 9, upper region 18 is aligned substantially horizontally, with the flue gases exiting from combustion chamber 10 through exit throat 5 being fed directly into a straightening chamber 132' sealingly engaged with exit throat 5. Chamber 132' functions substantially as discussed above in connection with the embodiment shown in FIG. 8. Chamber 132' differs from chamber 132 (FIG. 8), by reason of the fact that the exit port 134 is situated at the upper end of the chamber, rather than directly across from the opening 140 of the chamber. In all other respects, the structure and operation of chambers 132' and 132 are identical. Flue gases exiting from chamber 132' via opening 134 then flow along duct 101, in which heat exchange surfaces 102 and 103 are positioned, in generally the same manner as in the embodiment depicted in FIG. 4.

As a general matter, in the embodiments shown in FIGS. 7-9, a cooling fluidized bed 40 separated from the combustion zone is utilized in order to provide a high turn-down ratio (as discussed in connection with the embodiment shown in FIG. 2). Heat exchanger tube arrangement 42 in bed 40 may serve as a superheater or as a source of additional steam. If a high turn-down ratio is not necessary in the particular application of concern, cooling bed 40 may obviously be omitted, in which case, heat exchange surfaces (not shown) are inserted in lower region 11.

In the embodiments shown in FIGS. 7 and 8, the means for feeding combustible matter through inlet 17 may comprise any suitable conventional mechanical or pneumatic feeding mechanism (not shown).

It is obviously essential that external heat loss throughout each of the combustion and heat exchange systems disclosed in connection with FIGS. 1–9 be held to a minimum. Therefore, as is well known in the art, the internal surfaces of the apparatus shown in FIGS. 1–9 should be made thermally insulating wherever necessary, through the use of, for example, conventional refractory lining material.

It will be apparent to those of ordinary skill in the art that various modifications and variations can be made to the above-described embodiments of the invention without departing from the scope of the appended claims and their equivalents. As an example, although the invention has been described in the environment of combusting particulate material, such as wood wastes, municipal refuse, carbonaceous material, etc., it is apparent that the apparatus and method of the invention can be used in other environments in which fluidized bed reactors find utility, such as, for example, gasification and various chemical and metallurgical processes.

What is claimed is:

1. A method of operating a circulating fluidized bed reactor, comprising:
   providing a fluidized bed reactor containing a bed of granular material and having an upper region and a lower region, said upper region having a cylindrically shaped interior surface and a cylindrically shaped exit throat aligned concentrically with said interior surface, said exit throat having a diameter within the range of from about 4/10 to about 7/10 the diameter of said interior surface;
   feeding matter to be reacted into said lower region of the reactor;
   supplying a first stream of pressurized air to said reactor through a plurality of openings at the bottom of said lower region at a sufficient velocity to fluidize said granular material in the circulating regime, whereby at least a substantial portion of said granular material is continually entrained into said upper region;
   tangentially supplying a second stream of pressurized air to said upper region of the reactor through at least one opening in said cylindrical interior surface, wherein, at maximum operating capacity for the reactor, said second stream of air constitutes in excess of about 50% of the total pressurized air fed to the reactor;
   maintaining a Swirl number of at least about 0.6 and a Reynolds number of at least about 18,000 in said upper region for inducing in said entrained bed material and any gases present in said upper region a cyclone of turbulence which increases the rate of reaction in the reactor and internally generates at least one reverse flow zone in said upper region for returning said entrained bed material to said lower region of the reactor; and
   permitting the gases resulting from the reaction in said reactor to exit from the reactor through said exit throat, while retaining substantially all of said entrained granular material within the reactor.

2. A method as claimed in claim 1, wherein the ratio of the diameter of said exit throat divided by the diameter of said interior surface of said upper region lies within the range of from about 0.5 to about 0.6.

3. A method as claimed in claim 1, further comprising the step of providing a heat exchange surface immersed in said lower region of the reactor for removing heat from the fluidized bed.

4. A method as claimed in claim 1, further comprising the steps of permitting at least a portion of the granular material and reaction gases in said lower region of the reactor to overflow into a separate second fluidized bed situated adjacent to said lower region through an upper opening communicating with the upper portion of said lower region, and directing a portion of the granular material from said second fluidized bed into said lower region of the reactor through a lower opening communicating with the lower portion of said lower region, said second fluidized bed being fluidized in the bubbling regime and having a heat exchange surface immersed therein for removing heat therefrom.

5. A method as claimed in claim 4, including the step of supplying the heat removed from said second fluidized bed to a boiler or process heat supply.

6. A method as claimed in claim 1, wherein the total pressurized air supplied to said reactor is in excess of the stoichiometric amount needed for combustion.

7. A method as claimed in claim 1, including the step of gasifying solid or liquid fuel in said reactor, wherein the total pressurized air supplied to said reactor is less than the stoichiometric amount required for combustion.

8. A method as claimed in claim 1, wherein, at about maximum operating capacity for the reactor, in excess of about 80% of the pressurized air supplied to said reactor is supplied by said second stream of air, and said second stream of air is maintained at about ambient temperature.

9. A method as claimed in claim 1, wherein at about minimum operating capacity for the reactor, at least about 30% of the pressurized air supplied to said reactor is supplied by said second stream of air, and wherein the temperature of said second stream of air is maintained in excess of about 150° C.

10. A method as claimed in claim 1, wherein the temperature of said second stream of air is maintained at about ambient.

11. A method as claimed in claim 8 or 10, wherein at minimum operating capacity for the reactor, in excess of about 50% of the pressurized air supplied to said reactor is supplied by said second stream of air.

12. A method as claimed in claim 1, wherein the second stream of pressurized air is tangentially supplied through a plurality of openings in said cylindrical interior surface.

13. A method as claimed in claim 12, wherein the second stream of pressurized air is tangentially supplied to said reactor through a plurality of pairs of oppositely disposed openings in said cylindrical interior surface.

14. A method as claimed in claim 13, wherein said second stream is supplied through said plurality of pairs of oppositely disposed openings in a vertically aligned and spaced apart manner throughout said upper region of the reactor.

15. A method as claimed in claim 1, wherein combustion takes place at a temperature within the range of from about 500° C. to about 1000° C. in said reactor.

16. A method as claimed in claim 4, wherein said portion of the granular material is directed through said lower opening by providing a plurality of streams of gas flowing through at least a portion of said lower opening and into said lower region of the reactor.

17. A method as claimed in claim 16, wherein said portion of the granular material is further directed through said lower opening by directing the streams of gases which serve to fluidize said second fluidized bed in the general direction of said lower region of the reactor.

18. A fast fluidized bed reactor, comprising:
(a) a fluidized bed reaction chamber for containing a bed of granular material, said chamber having an upper region and a lower region, said upper region having a cylindrically shaped interior surface and a cylindrically shaped exit throat aligned concentrically with said interior surface, said exit throat having a diameter within the range of from about 4/10 to about 7/10 the diameter of said interior surface;
(b) means for feeding matter to be reacted into said lower region of the reaction chamber;
(c) means for supplying a first stream of pressurized air to said reaction chamber through a plurality of openings at the bottom of said lower region at a sufficient velocity to fluidize said granular material in the circulating regime, whereby at least a substantial portion of the granular material is continually entrained upward into said upper region; and
(d) means for tangentially supplying a second stream of pressurized air to said upper region of the reaction chamber through at least one opening in said cylindrically shaped interior surface, wherein, at maximum operating capacity for the reactor, the second stream of air constitutes in excess of about 50% of the total pressurized air fed to the reaction chamber, said second stream being supplied, and said reactor being constructed, in a manner adapted to: (i) provide a Swirl number of at least about 0.6 and a Reynolds number of at least about 18,000 in said upper region, thereby creating a cyclone of turbulence in said entrained bed material and any gases present in the upper region which increases the rate of reaction in said chamber and internally generates at least one reverse flow zone in said upper region for returning said entrained bed material to said lower region of said chamber, and (ii) permit the gases resulting from the reaction in said chamber to exit from said reaction chamber through said exit throat while retaining substantially all of said entrained granular material within said chamber.

19. A fast fluidized bed reactor as claimed in claim 18, wherein the ratio of the diameter of said exit throat divided by the diameter of said interior surface of said upper region lies within the range of from about 0.5 to about 0.6.

20. A fast fluidized bed reactor as claimed in claim 18, further comprising:
a second fluidized bed fluidized in the bubbling regime and situated adjacent to said lower region of said reaction chamber, said second fluidized bed having an upper opening communicating with the upper portion of said lower region for overflowing a portion of the granular material and reaction gases into said second fluidized bed and a lower opening communicating with the lower portion of said lower region for returning a portion of the granular material to said lower region; and
heat exchange surface immersed in said second fluidized bed for removing heat therefrom.

21. A fast fluidized bed reactor as claimed in claim 18, further comprising cyclone separator means operatively connected to said exit throat for separating the granular material and reaction gases exiting from said chamber and supplying the separated granular material to an inlet port located in said lower region of the reaction chamber.

22. A fast fluidized bed reactor as claimed in claim 21, further comprising a fluidized bed trap operatively connected between said cyclone separator means and said inlet port for receiving the separated granular material from the cyclone separator and overflowing it into said inlet port, said fluidized bed trap containing a solid partition for eliminating cross flow of gases between said reaction chamber and said cyclone separator means.

23. A fast fluidized bed reactor as claimed in claim 18, wherein the longitudinal axis of said upper region of said reaction chamber is aligned substantially vertically.

24. A fast fluidized bed reactor as claimed in claim 18, wherein the longitudinal axis of said upper region of said reaction chamber is aligned substantially horizontally.

25. A fast fluidized bed reactor as claimed in claim 19, further comprising heat exchange surface situated in said lower region of the reaction chamber for removing heat from the fluidized bed.

26. A fast fluidized bed reactor as claimed in claim 18, further comprising:
cyclone separator means operatively connected to said exit throat for separating any granular material exiting from said chamber from the reaction gases exiting from said chamber;
a second fluidized bed fluidized in the bubbling regime and situated adjacent to the lower region of said reaction chamber and operatively connected to said cyclone separator means for receiving and fluidizing at least a portion of the granular material separated from the reaction gases in said cyclone separator means, the second fluidized bed having an opening communicating with the upper portion of said lower region for overflowing a portion of the granular material into said lower region; and
a heat exchange surface immersed in said second fluidized bed for removing heat therefrom.

27. A fast fluidized bed reactor as claimed in claim 18, wherein the horizontal cross-sectional area of said upper region of said chamber is larger than that of said lower region of said chamber.

28. A fast fluidized bed reactor as claimed in claim 27, wherein said lower region of said chamber is conically shaped.

29. A fast fluidized bed reactor as claimed in claim 18, wherein said means for tangentially supplying a second stream of pressurized air to said reaction chamber includes a plurality of openings in said cylindrical interior surface.

30. A fast fluidized bed reactor as claimed in claim 29, wherein said means for tangentially supplying a second stream of pressurized air to said reaction chamber includes a plurality of pairs of oppositely disposed openings in said cylindrical interior surface.

31. A fast fluidized bed reactor as claimed in claim 30, wherein said plurality of pairs of oppositely disposed openings are vertically aligned and spaced apart throughout said upper region of the reaction chamber.

32. A fast fluidized bed reactor as claimed in claim 20, 25 or 26, further comprising boiler means operatively connected to said heat exchange surface.

33. A fast fluidized bed reactor as claimed in claim 20 or 26, wherein at least a portion of said lower region of said chamber is quadrangularly shaped in cross section, when viewed from above.

34. Apparatus as claimed in claim 20, further comprising means for providing a plurality of streams of gas flowing through at least a portion of said lower opening and into said lower region of said reaction chamber for directing a portion of the granular material through said lower opening into said lower region.

35. Apparatus as claimed in claim 34, further comprising means for directing the streams of gas which serve to fluidize said second fluidized bed in the general direction of said lower region of said reaction chamber for further directing a portion of the granular material through said lower opening into said lower region.

36. Apparatus as claimed in claim 18, further comprising:
a thermally insulated duct fluidly connected to said reaction chamber exit throat for conducting said reaction gases away from said chamber; and
heat exchange means situated in said duct for removing heat from said reaction gases.

37. Apparatus as claimed in claim 36, wherein said heat exchange means includes a plurality of superheater steam tubes or an evaporate convective surface.

38. Apparatus as claimed in claim 36 or 37, wherein said heat exchange means further includes a plurality of economizer tubes or air heater tubes.

39. Apparatus as claimed in claim 24, further comprising a fire tube boiler having its central fire tube fluidly connected to said reaction chamber exit throat, whereby said reaction gases exiting from said chamber supply heat to said fire tube boiler.

40. Apparatus as claimed in claim 39, wherein said fire tube includes:
a substantially flat plate situated beneath said exit throat and extending essentially the entire length of said fire tube, wherein the fly ash contained in said reaction gases collects on said plate; and
means for providing a plurality of streams of gas flowing toward the end of said fire tube opposite from said exit throat for directing said collected fly ash out of said fire tube through said opposite end, the end of said boiler adjacent said opposite end being adapted to collect said fly ash to permit removal thereof from said boiler.

41. Apparatus as claimed in claim 24, further comprising a straightening chamber fluidly connected to said exit throat for reducing the turbulence of the reaction gases exiting from said reaction chamber and substantially straightening the flow of said gases so as to direct them in a generally linear direction, said straightening chamber having an exit port situated so as to permit reaction gases having a substantially straightened flow to exit therefrom.

42. Apparatus as claimed in claim 41, further comprising a gas tube boiler having its gas tubes in fluid communication with said straightening chamber exit port, whereby said reaction gases exiting from said straightening chamber supply heat to said gas tube boiler.

43. Apparatus as claimed in claim 41, further comprising:
a thermally insulated duct fluidly connected to said straightening chamber exit port for conducting said straightened reaction gases away from said straightening chamber; and
heat exchange means situated in said duct for removing heat from said reaction gases.

44. Apparatus as claimed in claim 41, 42, or 43, wherein said straightening chamber includes means for collecting and removing fly ash deposited at the bottom thereof.

45. A fast fluidized bed reactor, comprising:
(a) a fluidized bed reaction chamber for containing a bed of granular material, said chamber having an upper region and a lower region, said upper region having its longitudinal axis aligned substantially horizontally and having a cylindrically shaped interior surface and a cylindrically shaped exit throat aligned concentrically with said interior surface, said exit throat having a smaller diameter than that of said interior surface;

(b) means for feeding matter to be reacted into said lower region of the reaction chamber;

(c) means for supplying a first stream of pressurized air to said reaction chamber through a plurality of openings in said lower region at a sufficient velocity to fluidize said granular material in the circulating regime, whereby at least a portion of the granular material is continually entrained upward into said upper region;

(d) means for tangentially supplying a second stream of pressurized air to said upper region of the reaction chamber through at least one opening in said cylindrically shaped interior surface, wherein, at maximum operating capacity for the reactor, the second stream of air constitutes in excess of about 50% of the total pressurized air fed to the reaction chamber, said second stream being supplied, and said reactor being constructed, in a manner adapted to: (i) provide a Swirl number of at least about 0.6 and a Reynolds number of at least about 18,000 in said upper region, thereby creating a cyclone of turbulence in the upper region which increases the rate of reaction in said chamber and creates at least one reverse flow zone in said upper region for returning at least a portion of said granular material to said lower region of said chamber, and (ii) permit the reaction gases in said upper region to exit from said reaction chamber through said exit throat while retaining substantially all of said granular material within said chamber; and (e) a fire tube boiler having its central fire tube fluidly connected to said reaction chamber exit throat, whereby said reaction gases exiting from said chamber supply heat to said fire tube boiler, said fire tube including:

a substantially flat plate situated beneath said exit throat and extending essentially the entire length of said fire tube, wherein the fly ash contained in said reaction gases collects on said plate; and means for providing a plurality of streams of gas flowing toward the end of said fire tube opposite from said exit throat for directing said collected fly ash out of said fire tube through said opposite end, the end of said boiler adjacent said opposite end being adapted to collect said fly ash to permit removal thereof from said boiler, and wherein said means for providing a plurality of streams of gas includes:

a plurality of nozzles extending through said plate, said plate being sealingly engaged in said fire tube to form a plenum chamber for supplying gas to said nozzles; and means for supplying gas to said plenum chamber.

46. A method of operating a circulating fluidized bed reactor, comprising:

providing a fluidized bed reactor containing a bed of granular material and having an upper region and a lower region, said upper region having a cylindrically shaped interior surface and a cylindrically shaped exit throat aligned concentrically with said interior surface, said exit throat having a diameter within the range of from about 4/10 to about 7/10 the diameter of said interior surface;

feeding matter to be reacted into said lower region of the reactor;

supplying a first stream of pressurized gaseous material to said reactor through a plurality of openings at the bottom of said lower region at a sufficient velocity to fluidize said granular material in the circulating regime, whereby at least a substantial portion of said granular material is continually entrained into said upper region;

tangentially supplying a second stream of pressurized gaseous material to said upper region of the reactor through at least one opening in said cylindrical interior surface, wherein, at maximum operating capacity for the reactor, said second stream of gaseous material constitutes in excess of about 50% of the total pressurized gaseous material fed to the reactor;

maintaining a Swirl number of at least about 0.6 and a Reynolds number of at least about 18,000 in said upper region for inducing in said entrained bed material and any gases present in said upper region a cyclone of turbulence which increases the rate of reaction in the reactor and internally generates at least one reverse flow zone in said upper region for returning said entrained bed material to said lower region of the reactor; and permitting the gases resulting from the reaction in said reactor to exit from the reactor through said exit throat, while retaining substantially all of said entrained granular material within the reactor.

47. A method as claimed in claim 46 wherein said reactor comprises a combustor and said first and second streams of pressurized gaseous material comprise air, and including maintaining the temperature throughout said reactor at a substantially uniform value.

* * * * *

UNITED STATES PATENT AND TRADEMARK OFFICE
CERTIFICATE OF CORRECTION

PATENT NO. : 4,457,289

DATED : July 3, 1984

INVENTOR(S) : Jakob Korenberg

It is certified that error appears in the above-identified patent and that said Letters Patent is hereby corrected as shown below:

Column 23, line 8:
Line 1 of claim 25, change "claim 19" to --claim 18--.

Signed and Sealed this

Second Day of April 1985

[SEAL]

Attest:

DONALD J. QUIGG

Attesting Officer     Acting Commissioner of Patents and Trademarks